US012591487B2

(12) United States Patent
Callewaert et al.

(10) Patent No.: US 12,591,487 B2
(45) Date of Patent: *Mar. 31, 2026

(54) GDDR RDF/QAR ACCELERATED SWAP SEQUENCES

(71) Applicant: Dell Products L.P., Hopkinton, MA (US)

(72) Inventors: Peter Callewaert, Eernegem (BE); Dennis Trulli, Jr., Hudson, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/793,997

(22) Filed: Aug. 5, 2024

(65) Prior Publication Data

US 2026/0037382 A1 Feb. 5, 2026

(51) Int. Cl.
*G06F 11/00* (2006.01)
*G06F 11/14* (2006.01)
*G06F 11/20* (2006.01)

(52) U.S. Cl.
CPC ...... *G06F 11/1438* (2013.01); *G06F 11/2071* (2013.01)

(58) Field of Classification Search
CPC ............ G06F 11/1438; G06F 11/2071; G06F 11/2082; G06F 11/2074; G06F 11/2076; G06F 11/3632; G06F 11/1658; G06F 11/1662; G06F 11/1675; G06F 11/1088; G06F 11/1092; G06F 11/1456
See application file for complete search history.

(56) References Cited

U.S. PATENT DOCUMENTS

2025/0181252 A1* 6/2025 Callewaert .............. G06F 3/067

* cited by examiner

*Primary Examiner* — Katherine Lin
(74) *Attorney, Agent, or Firm* — Anderson Gorecki LLP

(57) ABSTRACT

SQAR site and region swap sequences include a combination of full swap and half swap commands to avoid creating a cascaded R21 while reducing elongated RDF resume processing. This is accomplished by limiting the use of half swap commands to mirrors that do not have an RDF resume command in the affected swap sequence and that require half swap to avoid creation of a cascaded R21. Changing the replication direction for the other mirrors, if necessary in the context of a site or region swap sequence, is done using full swap commands, thus enabling fast RDF resume processing on those legs.

20 Claims, 36 Drawing Sheets

RDF/QAR Initial Conditions

RDF/QAR Initial Conditions

Planned AutoSwap

Half Swap DC3 (R2 - R2 @ DC4)

Full Swap DC1-DC2

RDF Resume DC2->DC1

ConGroup Refresh

RDF Resume DC1->DC3

Reactivate MSC

Suspend Replication

Half Swap DC1 (R2 - R2 @ DC2)

Full Swap DC1-DC3

Full Swap DC2-DC4

Half Swap DC1 (R1 -> R2 @ DC2)

R22 Link Block Switch @ DC2

Resume Pair Differential @ DC3

RDF Resume DC3->DC1

RDF Resume DC4->DC2

ConGroup Refresh

Reactivate MSC

Suspend Replication

Half Swap DC1 (R2 - R2 @ DC2)

Full Swap DC1-DC3

Full Swap DC2-DC4

Full Swap DC3-DC4

Half Swap DC2 (R1 -> R2 @ DC1)

R22 Link Block Switch @ DC1

Resume Pair Differential @ DC4

RDF Resume DC4->DC3

RDF Resume DC4->DC2

ConGroup Refresh

Reactivate MSC

GDDR RDF/QAR ACCELERATED SWAP SEQUENCES

TECHNICAL FIELD

The subject matter of this disclosure is generally related to electronic data storage.

BACKGROUND

Electronic data storage is a critical infrastructure for organizational processes that rely on software. A typical datacenter includes clusters of server computer "hosts" and multiple data storage nodes that are interconnected via network switches. The server computers host instances of applications ("host applications") that support organizational processes such as email, accounting, inventory control, e-business, and engineering. Host application data is maintained by the storage nodes. A host application image is a collection of logical disk drives, known as storage objects, devices, or volumes, on which all the data for a single host application is maintained. The host application image may be replicated at different data centers to enable failover without significant interruption of the host applications. A primary (R1) replica (aka production or active replica) of the host application image is accessed by the host servers. Secondary (R2) replicas (aka passive replicas) replicate primary replicas and typically are not accessed by the host servers. It is sometimes necessary or desirable to swap the "personalities" of the primary and secondary replicas. In a Geographically Dispersed Disaster Restart (GDDR) Remote Data Facility with Quadrilateral Asynchronous Replication (RDF/QAR), it is desirable to perform replica personality swaps without creating a cascaded R21 replica in which an R1 mirror of an R21 replica points to an R2 replica that is itself an R21 replica.

SUMMARY

An apparatus may comprise: a geographically dispersed disaster restart data facility with quadrilateral replication comprising a first storage array in a first datacenter in a first region, a second storage array in a second datacenter in the first region, a third storage array in third datacenter in a second region, and a fourth storage array in fourth datacenter in the second region; the first storage array configured to maintain a R11 storage object that is synchronously replicated to a first R21 storage object maintained by the second storage array via a synchronous leg; the first storage array further configured to asynchronously replicate the first R11 storage object to a second R21 storage object maintained by the third storage array via a first asynchronous leg; the second storage array configured to asynchronously replicate the first R21 storage object to a R22 storage object maintained by the fourth storage array via a second asynchronous leg; the second R21 storage object maintained by the third storage array being paired with the R22 storage object maintained by the fourth storage array via a recovery leg; the geographically dispersed disaster restart data facility with quadrilateral replication configured to perform site swaps using a combination of replica personality half swaps and replica personality full swaps.

A method may comprise: in a storage system comprising a geographically dispersed disaster restart data facility with quadrilateral replication comprising a first storage array in a first datacenter in a first region, a second storage array in a second datacenter in the first region, a third storage array in third datacenter in a second region, and a fourth storage array in fourth datacenter in the second region; configuring the first storage array to maintain a R11 storage object that is synchronously replicated to a first R21 storage object maintained by the second storage array via a synchronous leg; configuring the first storage array to asynchronously replicate the first R11 storage object to a second R21 storage object maintained by the third storage array via a first asynchronous leg; configuring the second storage array to asynchronously replicate the first R21 storage object to a R22 storage object maintained by the fourth storage array via a second asynchronous leg; pairing the second R21 storage object maintained by the third storage array with the R22 storage object maintained by the fourth storage array via a recovery leg; and performing site swaps using a combination of replica personality half swaps and replica personality full swaps.

A non-transitory computer-readable storage medium may store instructions that when executed by at least one computer in a storage system including a first storage array in a first datacenter in a first region, a second storage array in a second datacenter in the first region, a third storage array in third datacenter in a second region, and a fourth storage array in fourth datacenter in the second region, perform a method comprising: configuring the first storage array to maintain a R11 storage object that is synchronously replicated to a first R21 storage object maintained by the second storage array via a synchronous leg; configuring the first storage array to asynchronously replicate the first R11 storage object to a second R21 storage object maintained by the third storage array via a first asynchronous leg; configuring the second storage array to asynchronously replicate the first R21 storage object to a R22 storage object maintained by the fourth storage array via a second asynchronous leg; pairing the second R21 storage object maintained by the third storage array with the R22 storage object maintained by the fourth storage array via a recovery leg; and performing site swaps using a combination of replica personality half swaps and replica personality full swaps The summary does not limit the scope of the claims or the disclosure. All examples, embodiments, aspects, implementations, and features can be combined in any technically possible way and the method and process steps may be performed in any order.

Various features and advantages will become more apparent from the following detailed description of exemplary embodiments in conjunction with the drawings.

DETAILED DESCRIPTION

The terminology used in this disclosure should be interpreted broadly within the limits of subject matter eligibility.

The terms "disk," "drive," and "disk drive" are used interchangeably to refer to non-volatile storage media and are not intended to refer to any specific type of non-volatile storage media. The terms "logical" and "virtual" refer to features that are abstractions of other features, such as abstractions of tangible features. The term "physical" refers to tangible features that possibly include, but are not limited to, electronic hardware. For example, multiple virtual computers could operate simultaneously on one physical computer. The term "logic" refers to special purpose physical circuit elements, firmware, software, computer instructions that are stored on a non-transitory computer-readable medium and implemented by multi-purpose tangible processors, and any combinations thereof. Embodiments of the inventive concepts are described as being implemented in a data storage system that includes host servers and a storage array as the storage node. Such implementations are not limiting. For example, a wide variety of storage nodes might be implemented with the inventive concepts. Those of ordinary skill in the art recognize that there are a wide variety of implementations of the inventive concepts within the scope of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
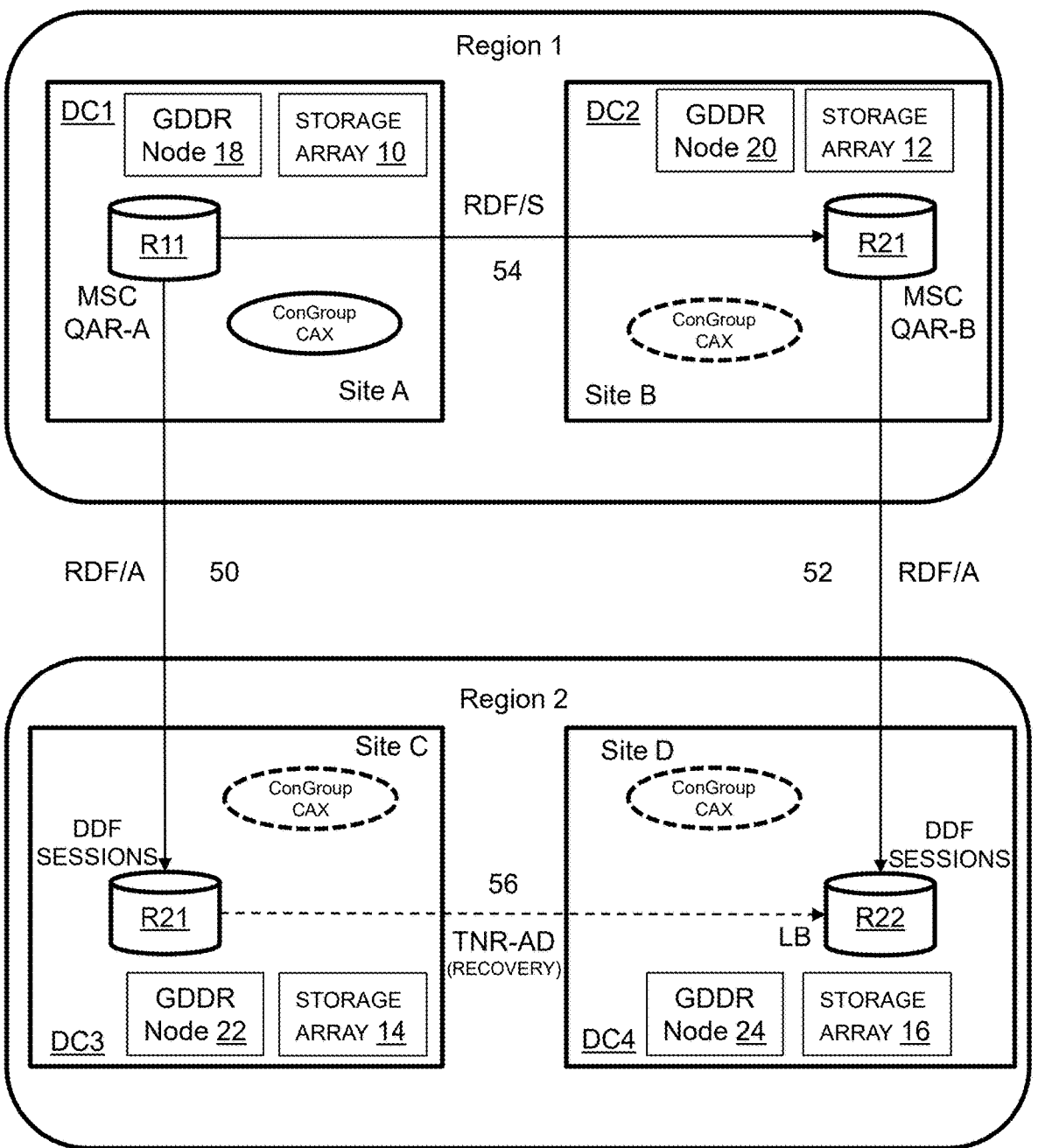
FIG. 1 illustrates a GDDR RDF/QAR storage system.

FIG. 1 illustrates a Geographically Dispersed Disaster Restart (GDDR) Remote Data Facility with Quadrilateral Asynchronous Replication (RDF/QAR). The GDDR RDF/QAR includes four data centers DC1, DC2, DC3, DC4 corresponding to site A, site B, site C, and site D, respectively, that are in two geographic regions labelled as region 1 and region 2. DC1 and DC2 are in region 1. DC3 and DC4 are in region 2. DC1, which is a primary site, includes a storage array 10 and GDDR node 18. DC2, which is a secondary site, includes a storage array 12 and GDDR node 20. DC3, which is a primary site, includes a storage array 14 and GDDR node 22. DC4, which is a secondary site, includes a storage array 16 and GDDR node 24. Intra-regional links such as DC1 to DC2 have a maximum allowable physical distance, e.g., 200 km. Inter-regional links do not have such a limit and are greater than the intra-regional limit in some implementations.

The GDDR nodes 18, 20, 22, 24 may be implemented on separate logical partitions of different mainframe computers at different sites. Each GDDR node monitors its local datacenter for failures such as inter-datacenter communication failures and failures associated with the local storage arrays. Each datacenter is depicted with a single storage array for purposes of explanation but would typically include two or more storage arrays.

The GDDR nodes may be configured to automatically respond to failures by performing actions such as automated site swaps in which a primary site fails over to a secondary site so that production data remains accessible and host applications continue functioning.

Replication is performed by source-target replica pairs. An R1 replica is a member of a replication pair at a source (production) site. R1 replicas are generally Read/Write accessible to the application host. An R2 replica is a member of a replication pair at a target (remote) site. During normal operations, host IO writes to the R1 replica are mirrored over RDF links to the R2 replica. In general, data on R2 replicas is not available to the host application while the replication relationship is active. In RDF synchronous mode (RDF/S), however, an R2 replica can be in a Read-Only mode that allows a host to read from the R2 replica. An R11 replica is the R1 replica in separate pairings with two target R21 replicas. Links (legs) 50, 54 to both R21 replicas are active. R21 replicas have a dual role and are used in cascaded 3-site configurations. R22 replicas are a target for two R21 replica sources, only one of which is actively replicated at any point in time. In the illustrated embodiment, R21 (site B)-R22 leg 52 is active and R21 (site C)-R22 recovery leg 56 is inactive. RDF/A replication on leg 50 is independent of RDF/A replication on leg 52, so R21 (site C) and R22 may differ at a given point in time. Differential Data Facility (DDF) software sessions track differences between R21 (site C) and R22.

Full-bandwidth RDF/QAR is a four-site implementation of synchronous replication (RDF/S) and asynchronous replication (RDF/A) that enables differential resynchronization between sites along the perimeter of a "square" RDF topology using redundant asynchronous legs 50, 52 for continuous Disaster Recovery (DR) protection out of region. A production dataset such as a host application image stored on storage objects of a replication consistency group (ConGroup) is maintained at DC1 by storage array 10 on replica R11. R11 is synchronously replicated at DC2 on replica R21 by storage array 12 via synchronous leg 54. R11 is synchronously replicated by marking updated tracks of R11 as invalid until the changes are written to the synchronous remote replica R21 in DC2. Synchronously replicated host writes are contemporaneously written to both storage arrays in real time before the host application IO completes. Acknowledgments are not sent to the host until the data is stored in cache on both storage arrays, so remote storage array 12 must return an acknowledgement of replication of the changes to storage array 10 before the updated tracks on R11 can be marked valid and accessed again by a host application. RDF/S maintains a real-time mirror image of data between R1 and R2 devices. R11 is asynchronously replicated at DC3 on replica R21 by storage array 14 via RDF/A over leg 50. RDF/A maintains a dependent-write consistent copy between the R1 and R2 devices. All host writes are collected over a configurable time interval, e.g., from 15-60 seconds, and sent to the remote storage array as a "delta set." Unlike synchronous replication, local storage array 10 does not wait for an acknowledgement of replication of the changes by remote storage array 14 before marking the updated tracks as valid. R21 is asynchronously replicated at DC4 on replica R22 by storage array 16 via RDF/A over leg 52. R11 is asynchronously replicated by writing updated tracks of R11 to the asynchronous remote replica R21. Asynchronous replication may be more practical to implement than synchronous replication when acknowledgment receipt latency would be too disruptive to host application performance. Acknowledgment receipt latency is at least in part a function of physical distance so inter-region links are subject to greater latency than intra-region links. Advantageously, all devices in the full-band-width RDF/QAR configuration form perfect quadruplets, with R11 devices at DC1, R21 devices at DC2 and DC3, and R22 devices at DC4. DDF sessions are activated at sites DC3 and DC4 at startup and are rotated in coordination with the opposite leg RDF/A cycle switches. The RDF/SQAR configuration provides the ability to recover from a single or dual unplanned site outage in one region with RDF/S protection established differentially between the recover sites in another region.

Figure 2:
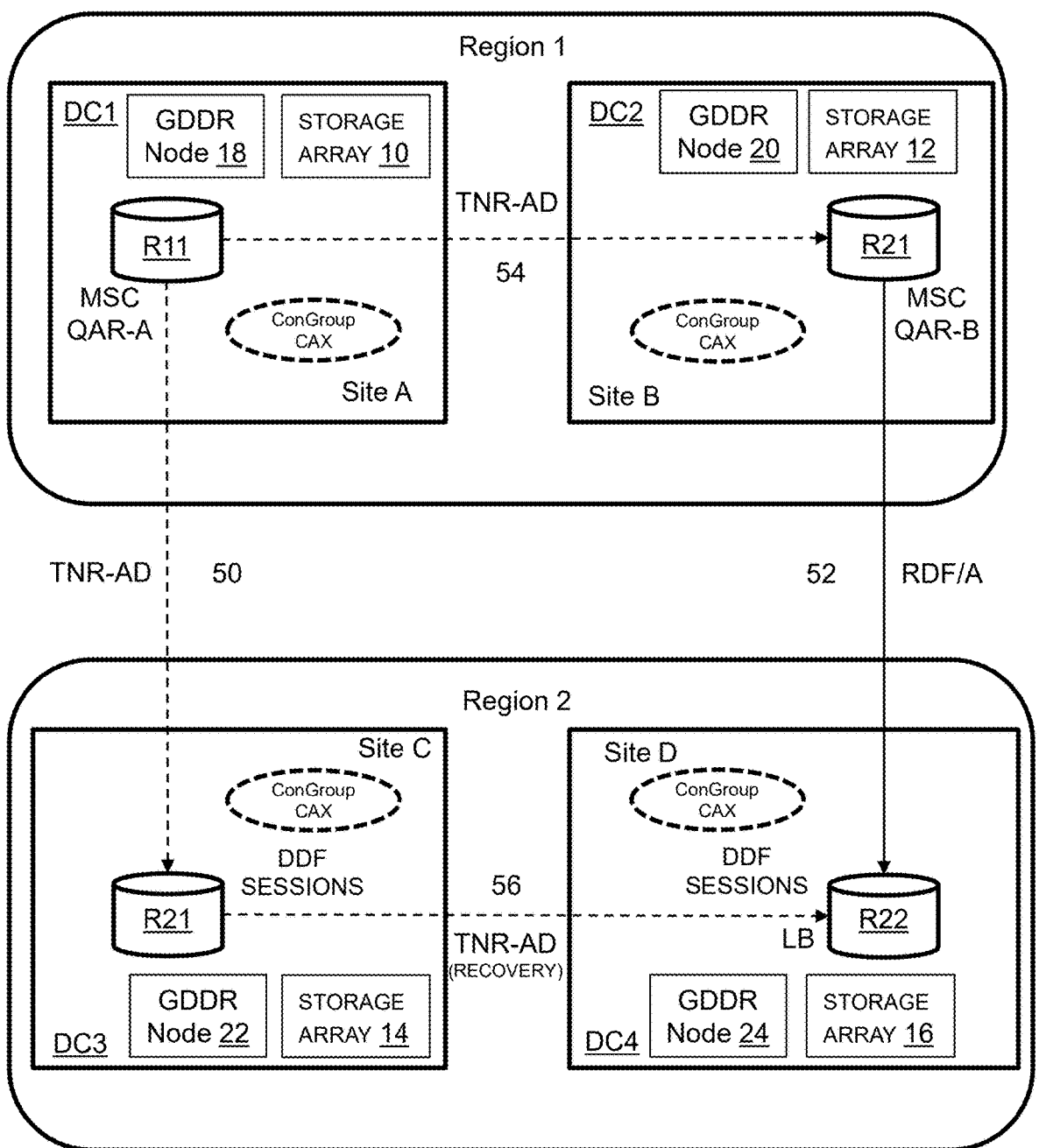
FIGS. 2 through 9 illustrate an R11-R21 intra-region (site A to site B) swap sequence that avoids creation of a cascaded R21.
Figure 3:
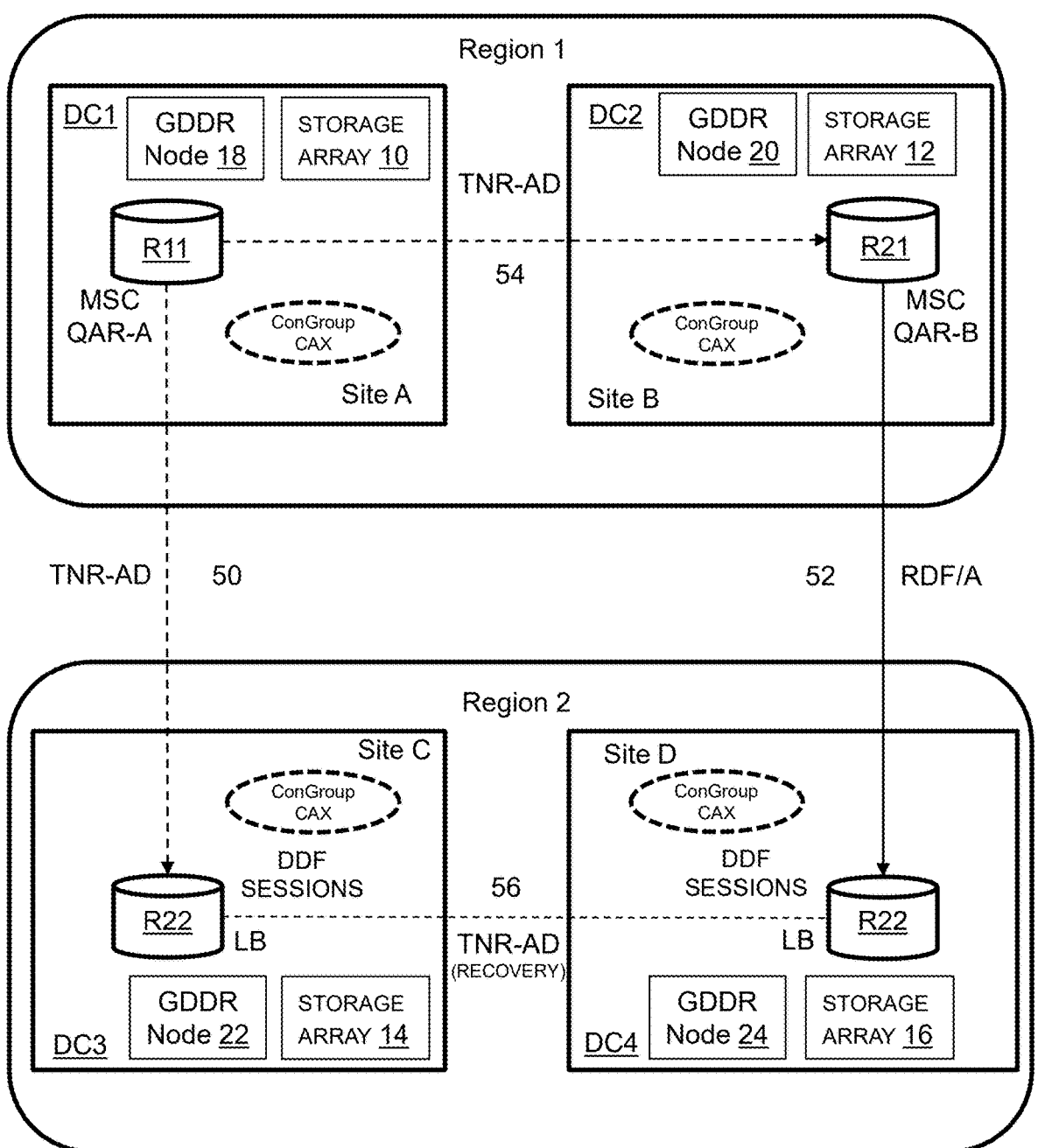
Figure 4:
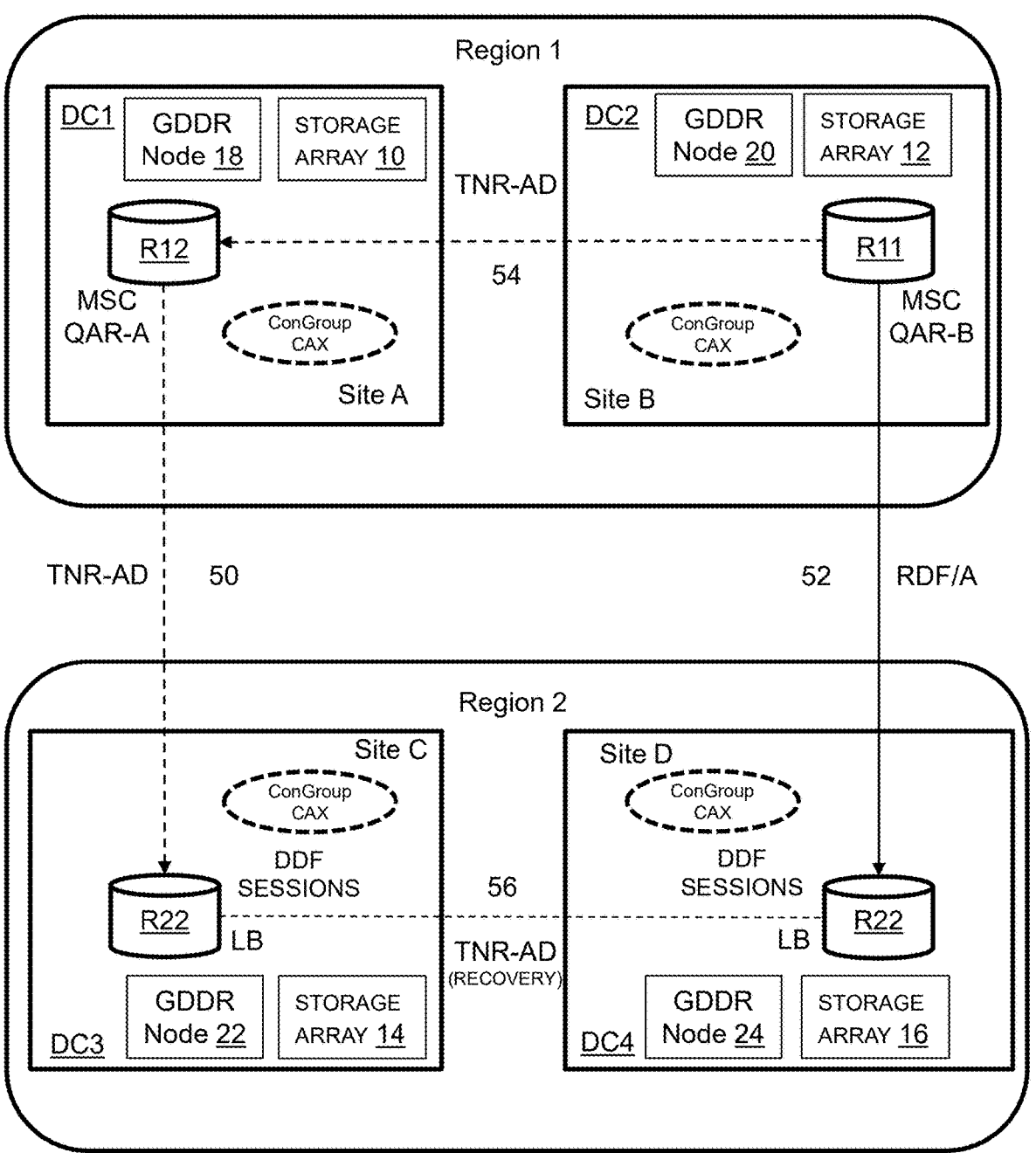
Figure 5:
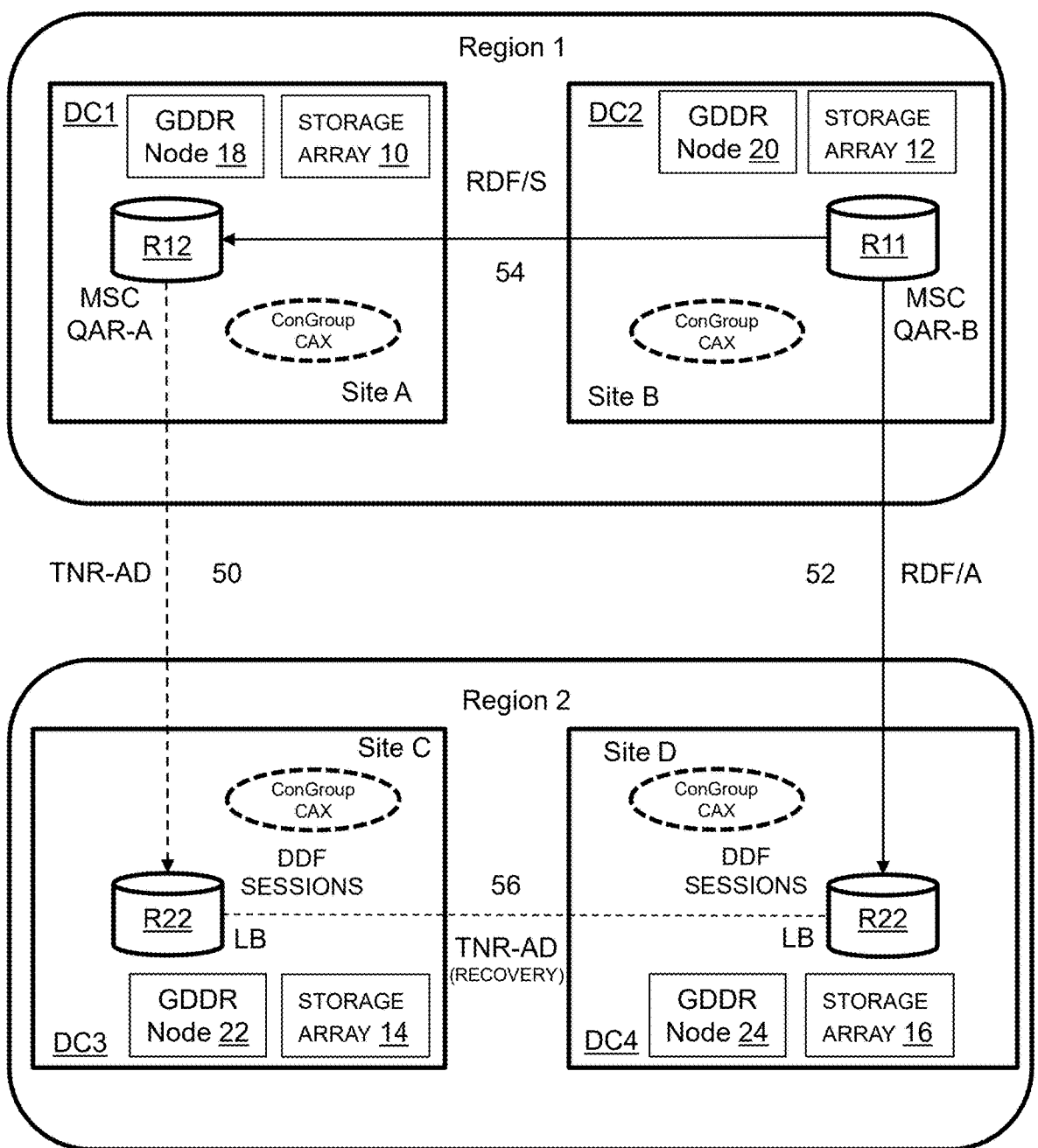
Figure 6:
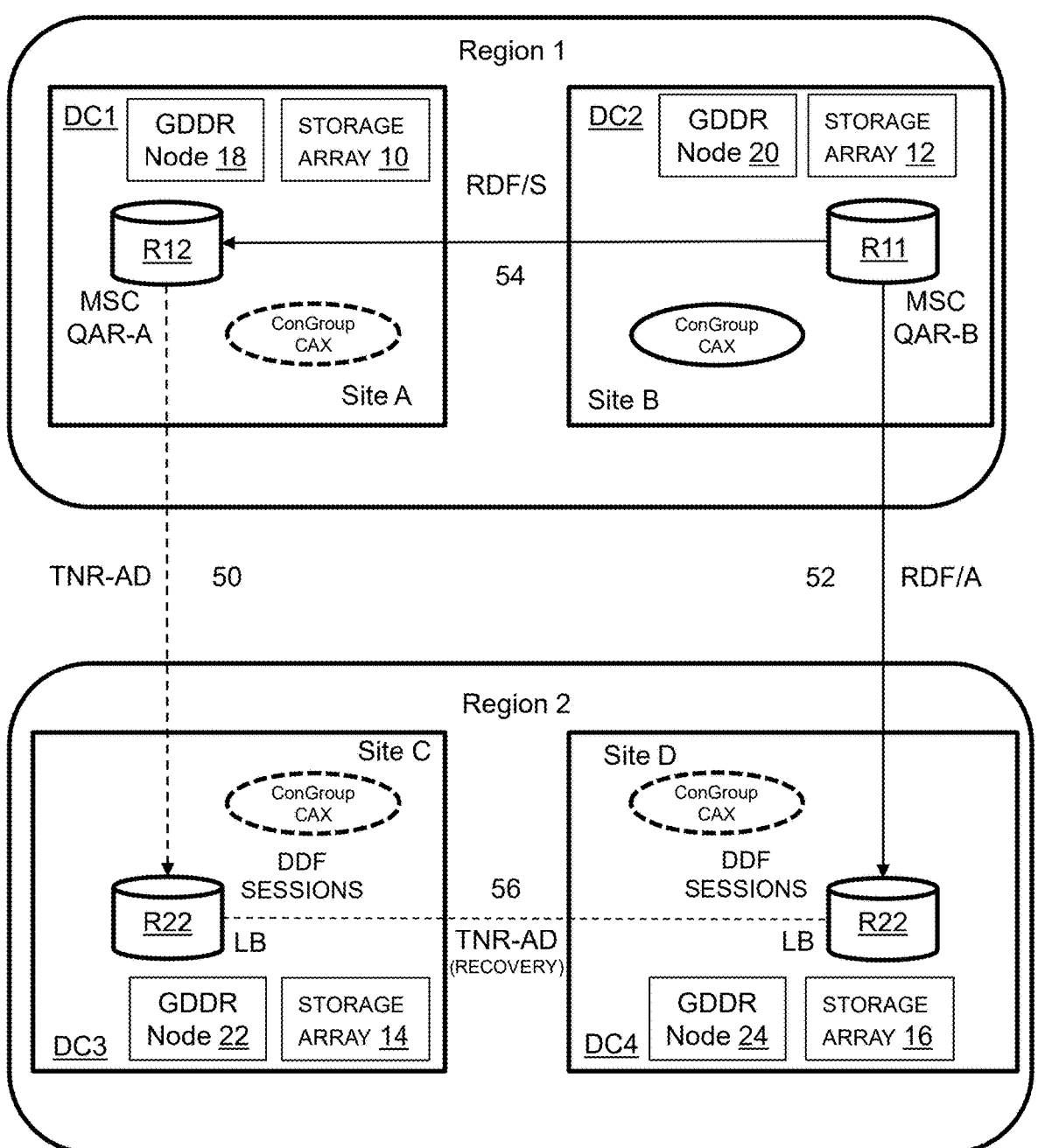
Figure 7:
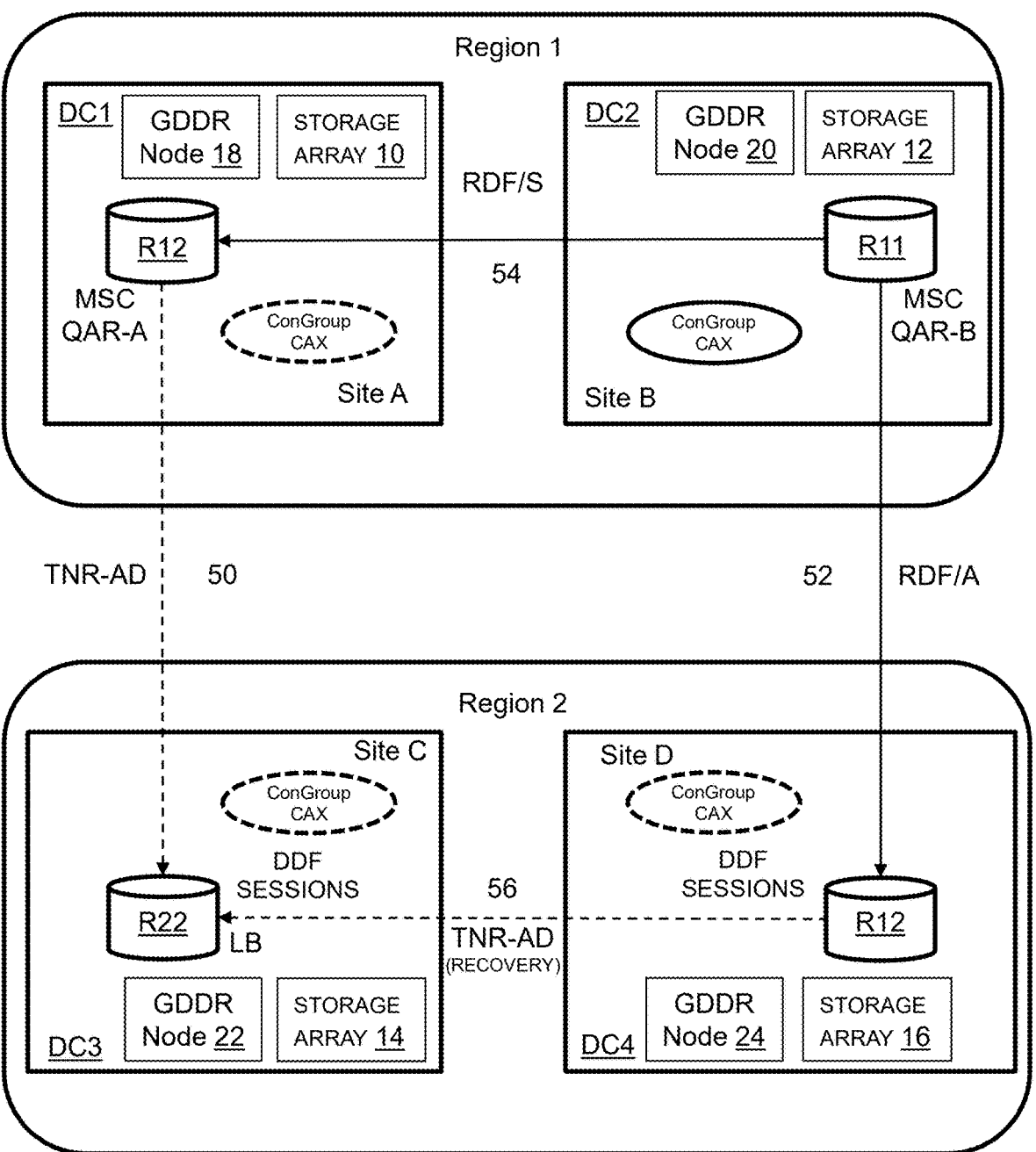
Figure 8:
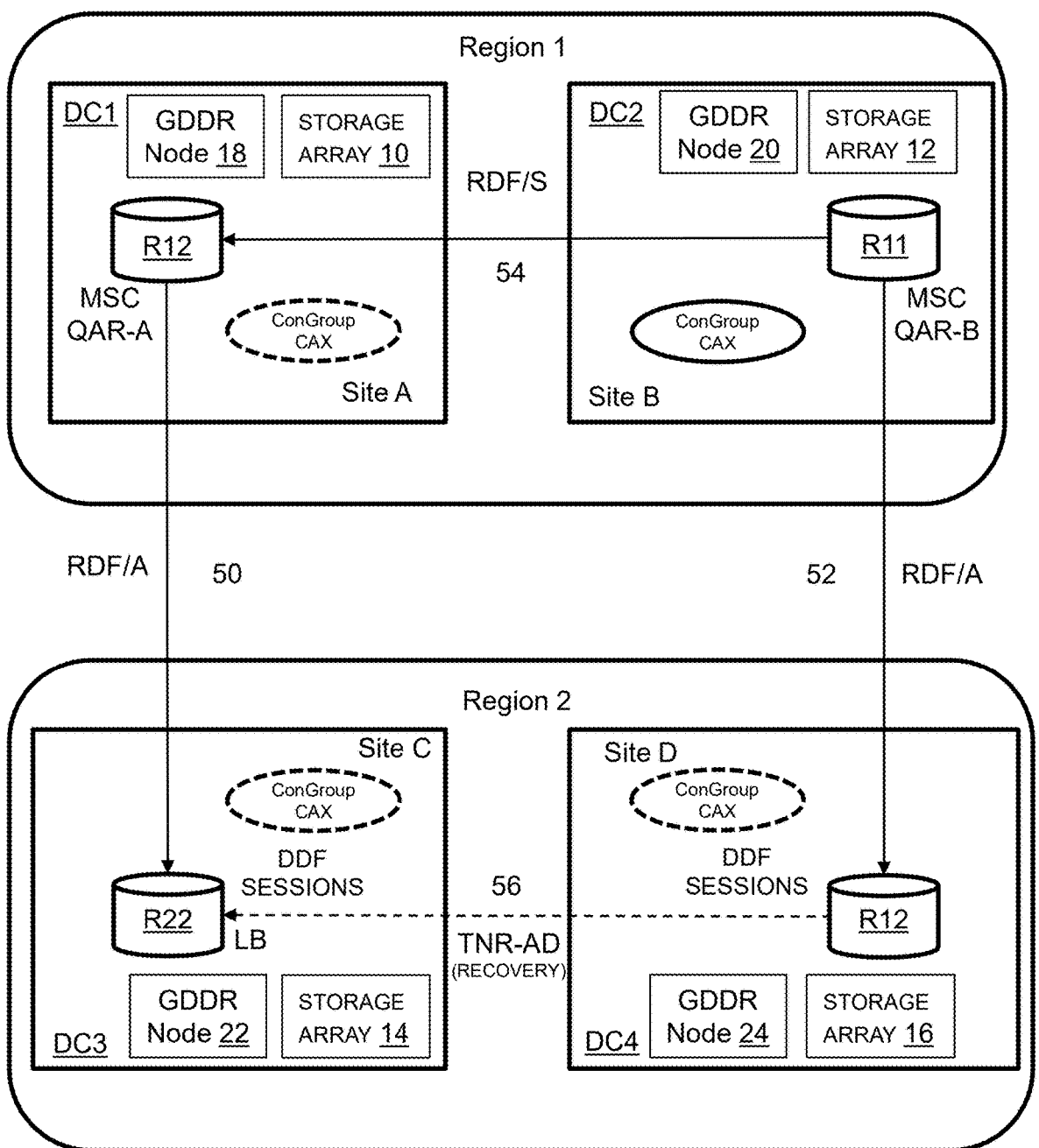
Figure 9:
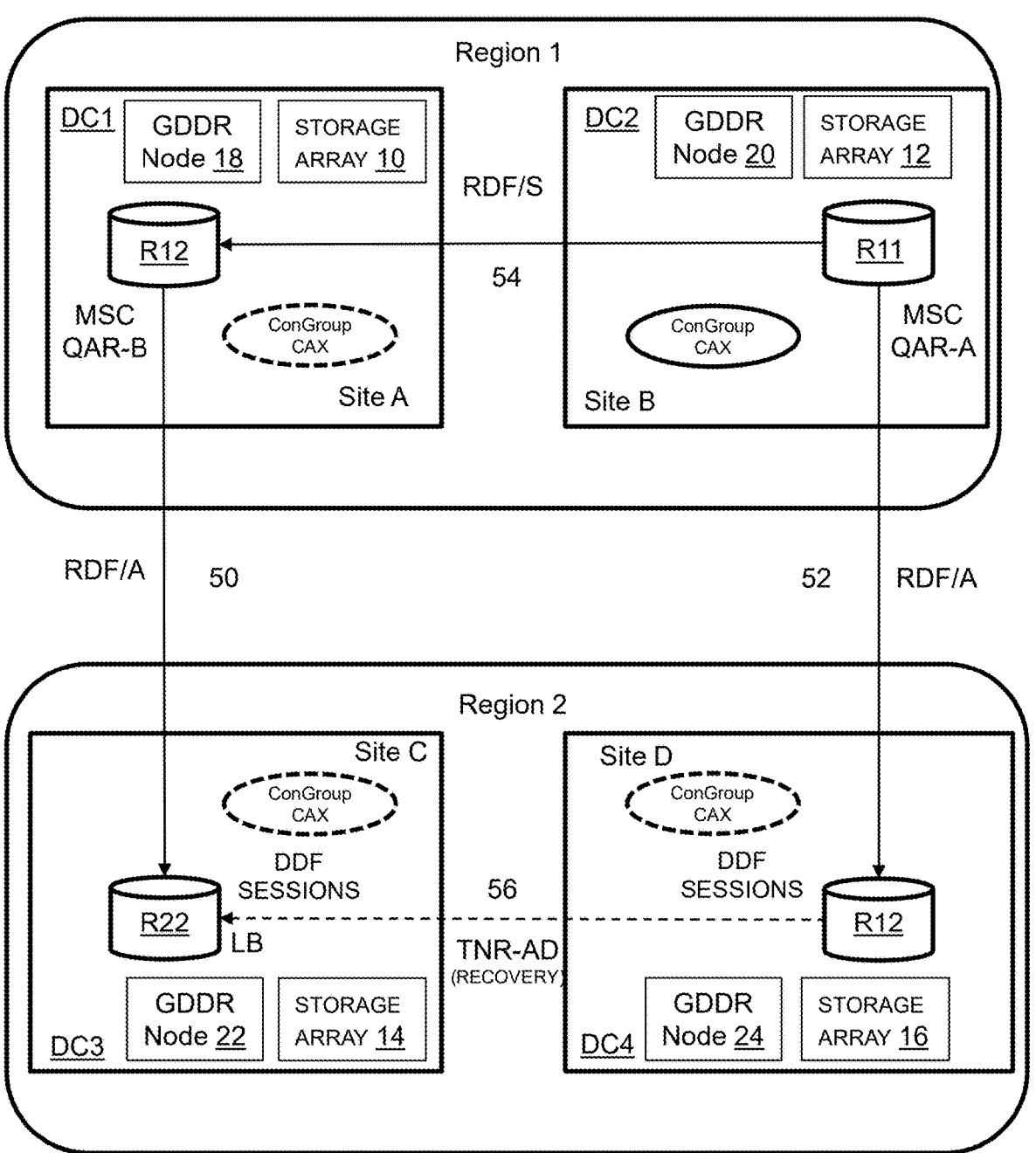

FIGS. 2 through 9 illustrate an R11-R21 intra-region (site A to site B) swap sequence that avoids creation of a cascaded R21. As shown in FIG. 2, suspension of replication causes the consistency group at site A to become inaccessible to the hosts, RDF/S replication over leg 54 is inactivated (set to target not ready (TNR)-adaptive copy mode (AD)), and RDF/A replication over leg 50 is inactivated (TNR-AD). As shown in FIG. 3, a half-swap updates the personality of the replica at site C from R21 to R22. A half swap changes the personality of only one replica of a replication pair. A full swap contemporaneously changes the personalities of both replicas of a replication pair. A full swap avoids an RDF resume operation, thereby reducing swap time. Following the half swap, there is no longer a replication pairing relationship between the resulting R22 replicas at site C and site D. As shown in FIG. 4, a full swap between DC1 and DC2 results in an R12 replica at DC1 and an R11 replica at DC2. As shown in FIG. 5, synchronous replication between DC1 and DC2 is resumed on leg 54, but now from R11 at DC2 as source to R12 at DC1 as target. As shown in FIG. 6, a consistency group refresh makes the R11 replica at DC2 accessible to the host servers. As shown in FIG. 7, a half swap updates the R22 replica at DC4 to an R21 replica that is a source for the R22 replica target at DC3. As shown in FIG. 8, replication is resumed between DC1 and DC3; specifically, from R12 at site A to R22 at site C over the asynchronous leg 50. MSC is reactivated ss shown in FIG. 9, thereby completing the R11-R21 intra-region (site A to site B) swap.

Figure 10:
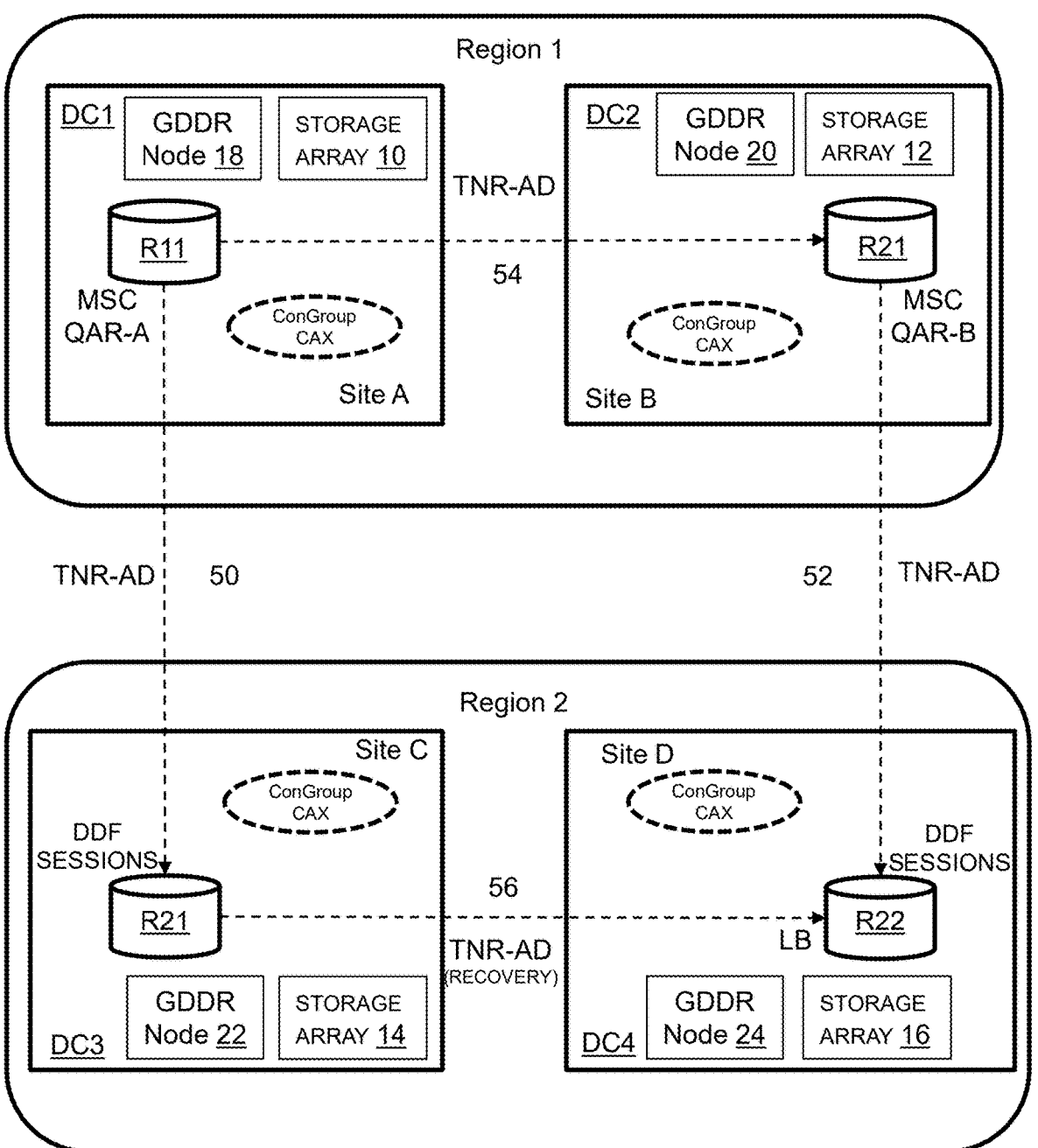
FIGS. 10 through 21 illustrate an R11-R21 inter-region (site A to site C) swap sequence that avoids creation of a cascaded R21.
Figure 11:
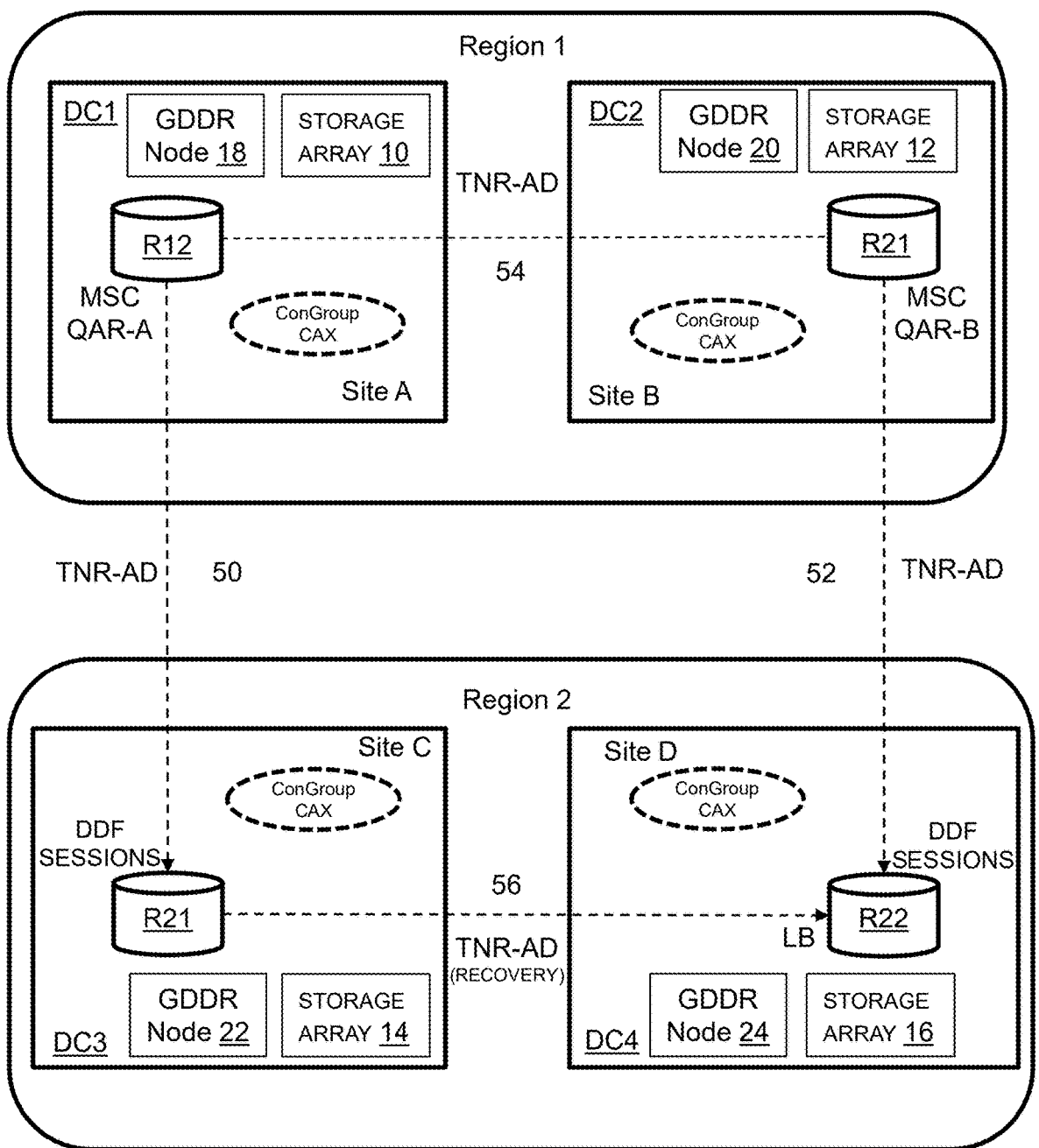
Figure 12:
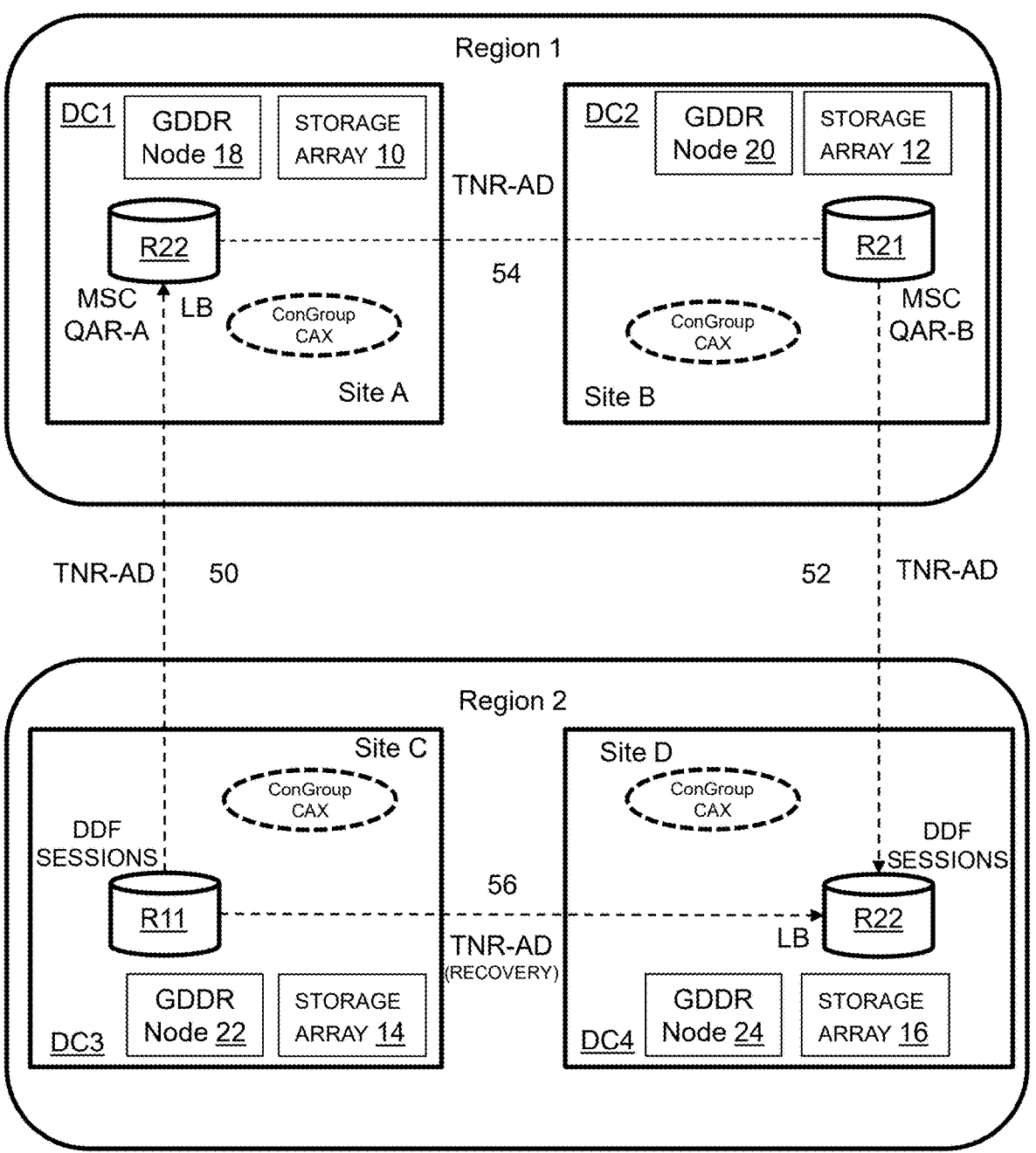
Figure 13:
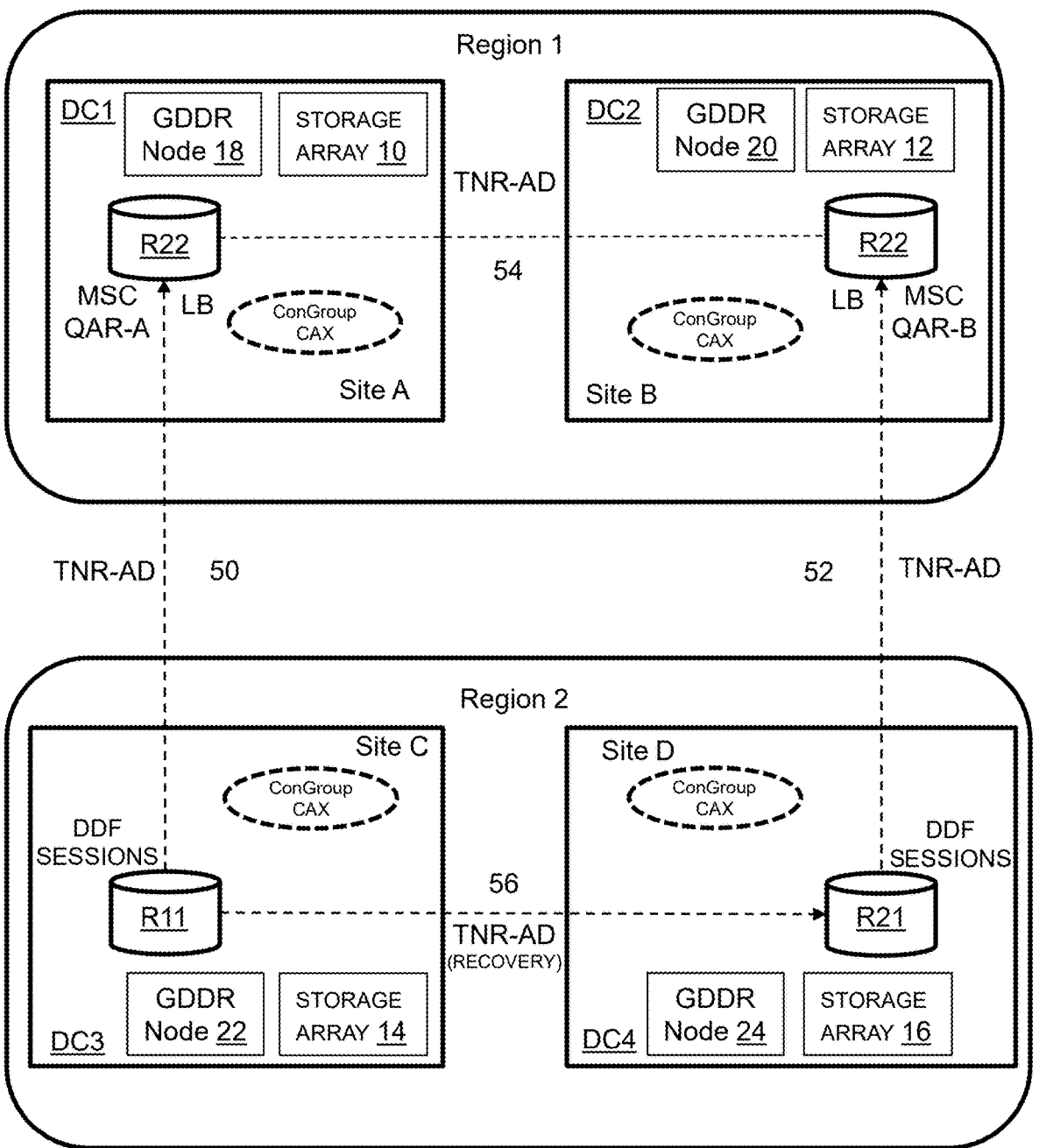
Figure 14:
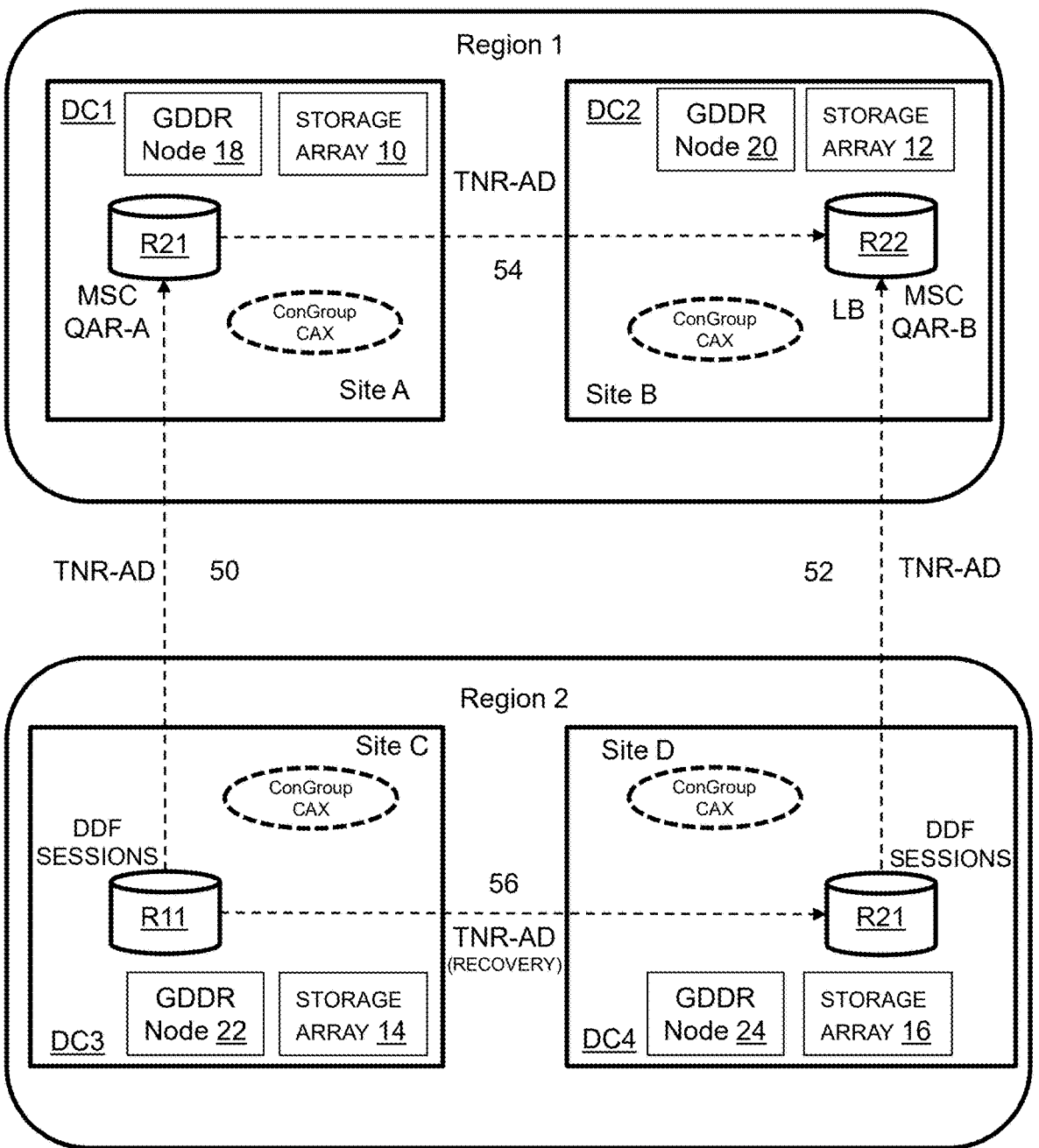
Figure 15:
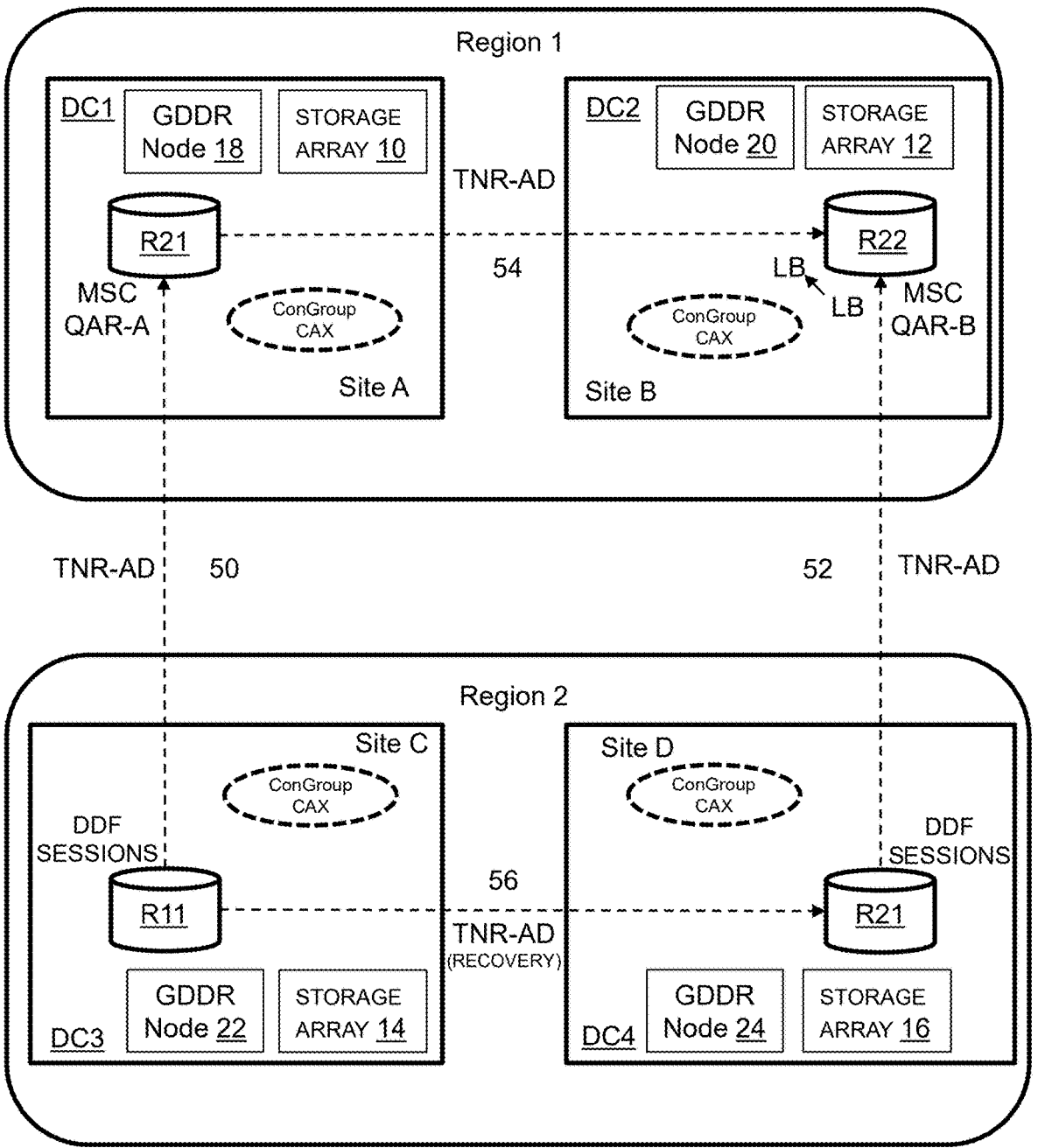
Figure 16:
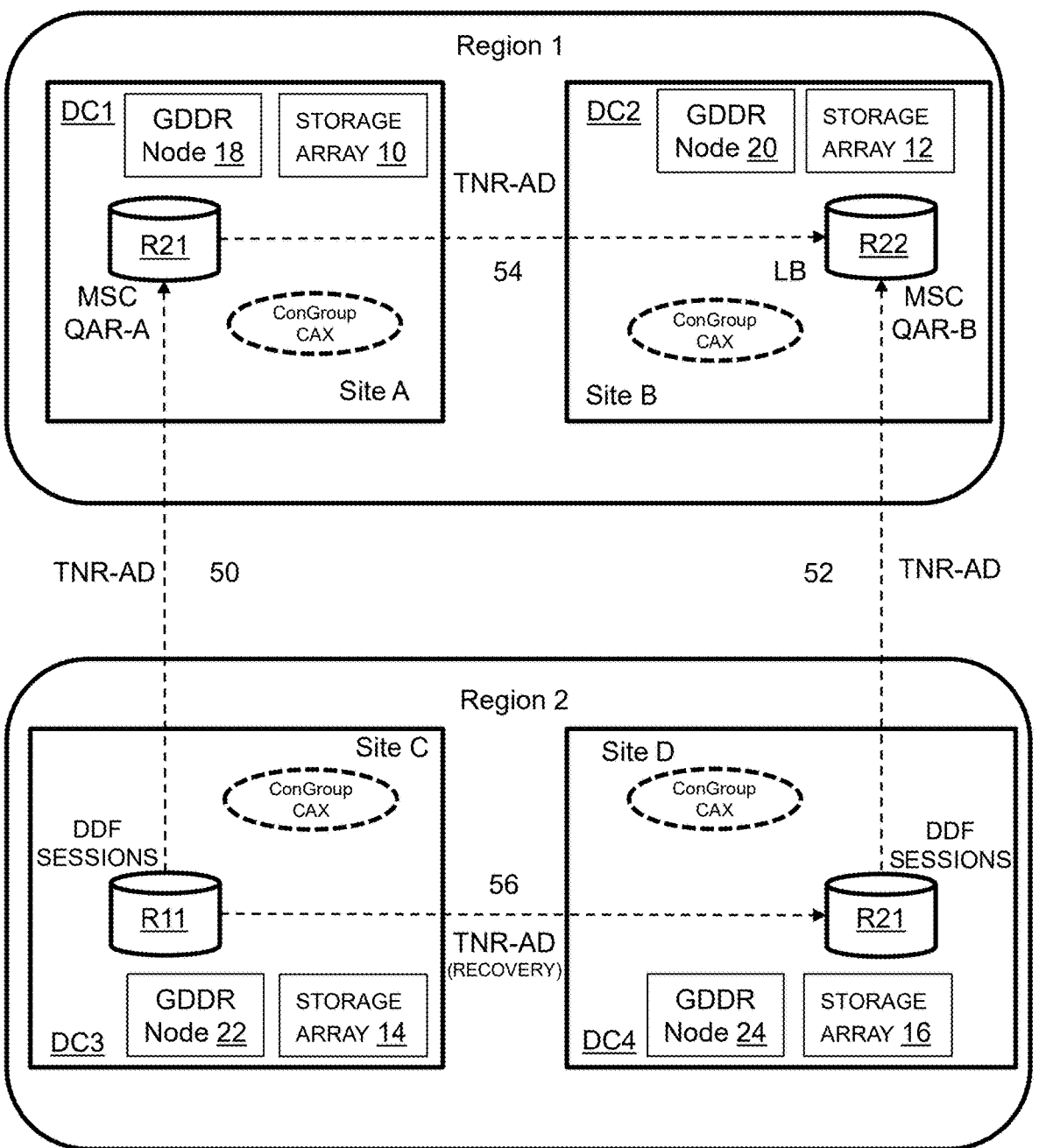
Figure 17:
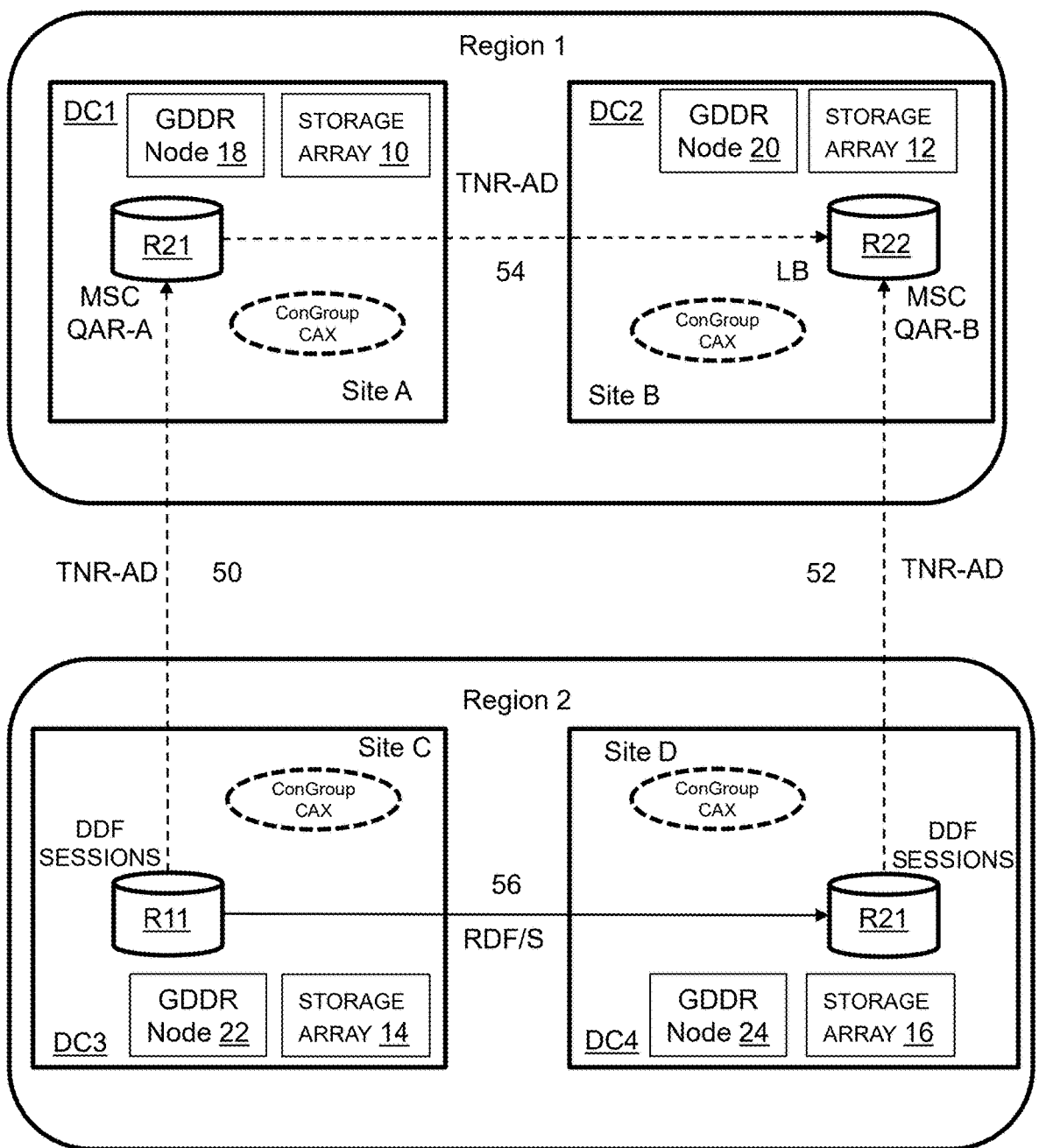
Figure 18:
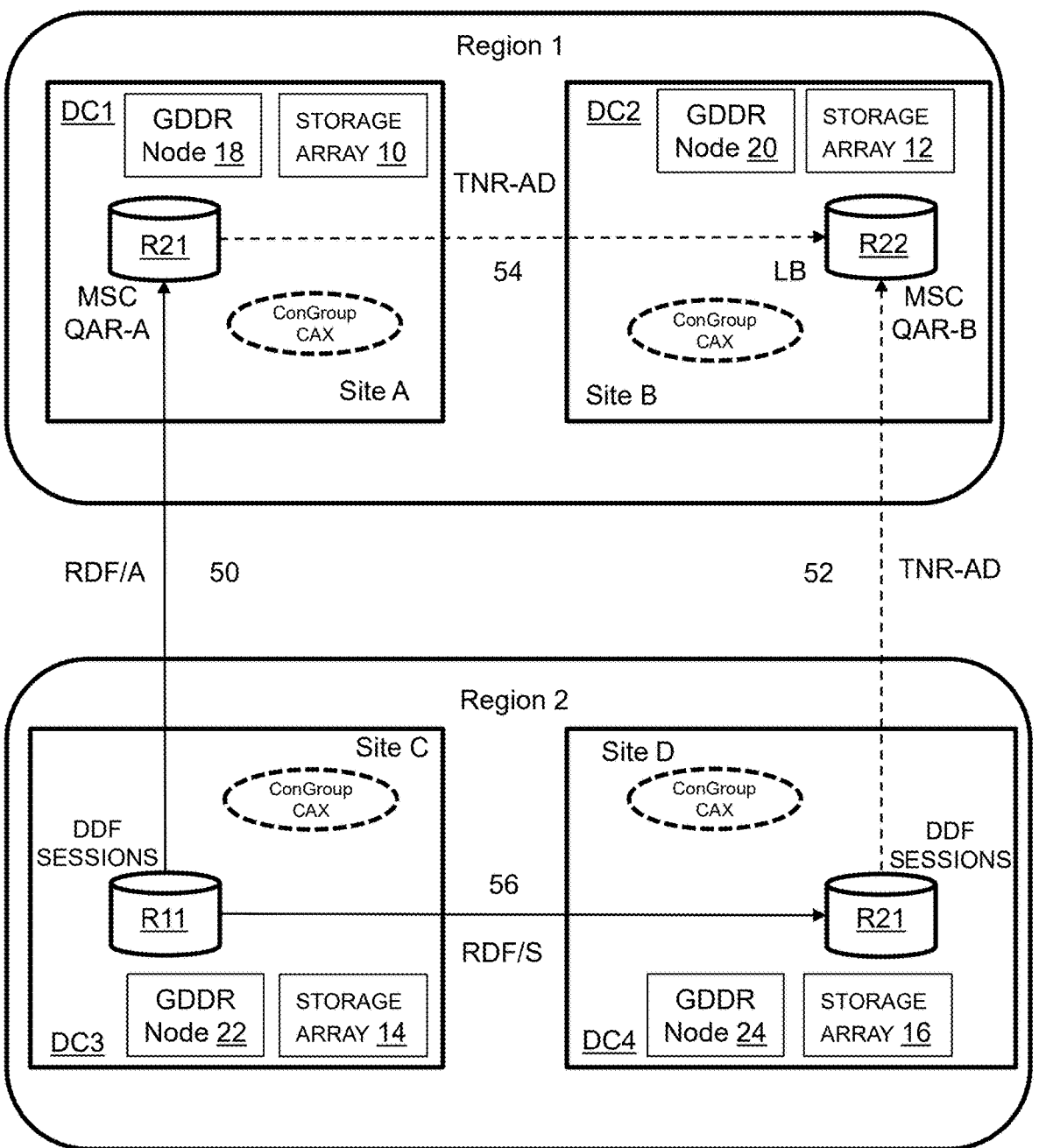
Figure 19:
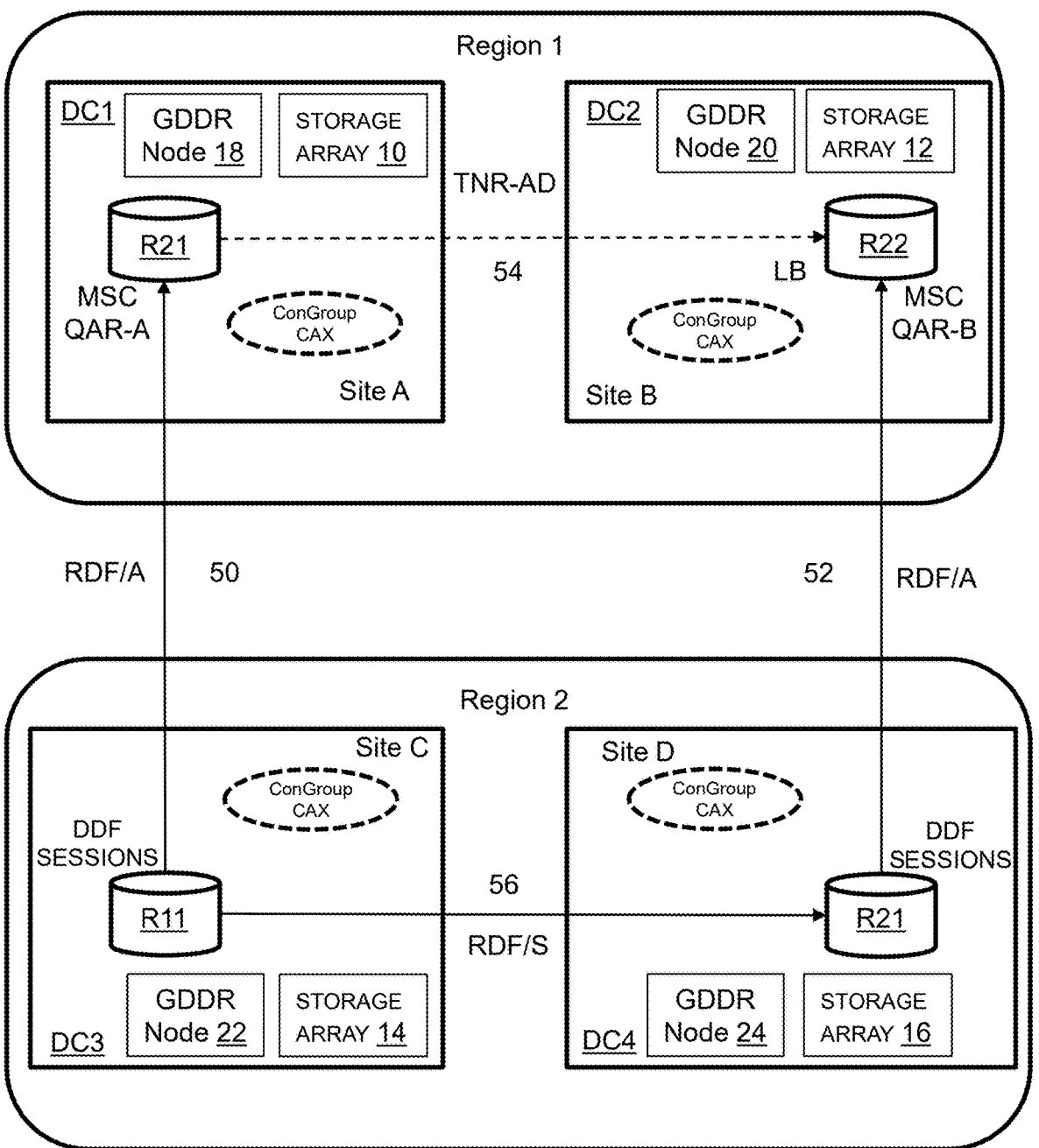
Figure 20:
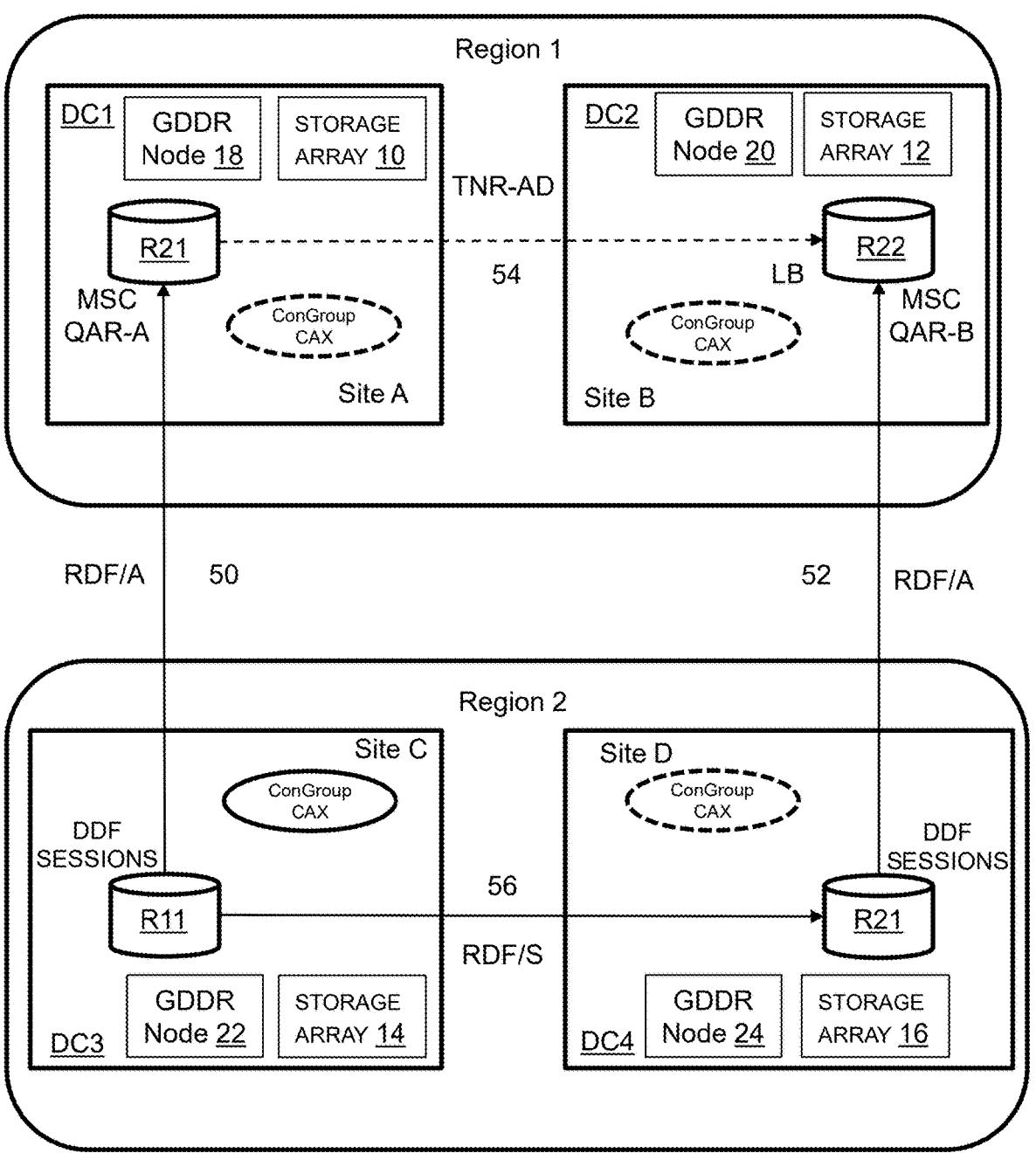
Figure 21:
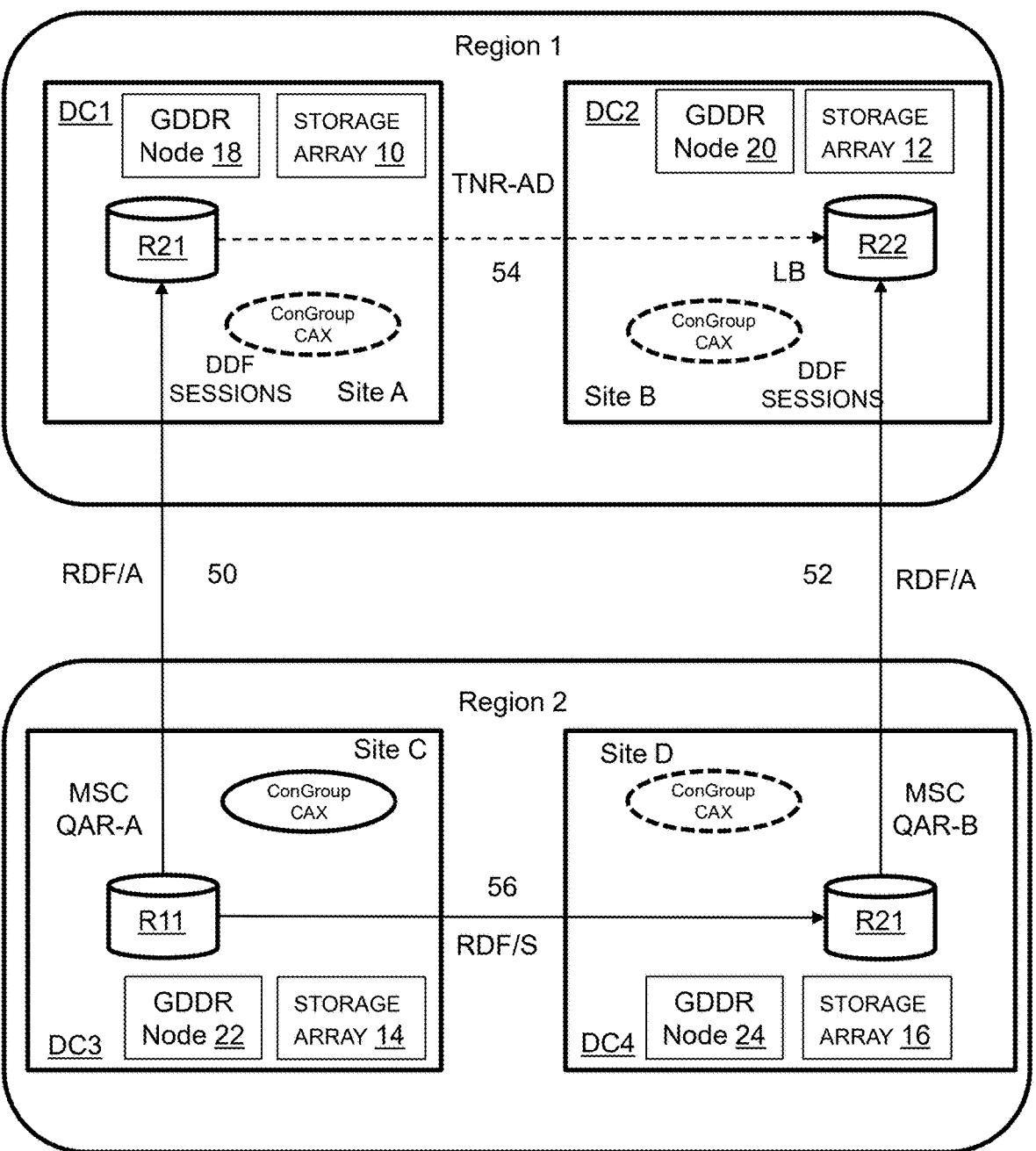

FIGS. 10 through 21 illustrate an R11-R21 inter-region (site A to site C) swap sequence that avoids creation of a cascaded R21. As shown in FIG. 10, suspension of replication causes the consistency group at site A to become inaccessible to the hosts, RDF/S replication over leg 54 is inactivated (set to TNR-AD), and RDF/A replication over leg 50 and leg 52 is inactivated (set to TNR-AD). As shown in FIG. 11, a half swap changes the personality of the replica at site A to R12. As shown in FIG. 12, a full swap between DC1 and DC3 results in an R22 replica at site A and an R11 replica at site C. As shown in FIG. 13, a full swap between DC2 and DC4 results in an R22 replica at site B and an R21 replica at site D. As shown in FIG. 14, a half swap at DC1 updates the personality of the R22 replica at site A to R21. As shown in FIG. 14, the pairing relationship of the R22 replica at site B is switched from the R21 at site D to the R21 at site A. As shown in FIG. 16, differential tracking is resumed at DC3. As shown in FIG. 17, replication between R11 at site C and R21 at site D is resumed over synchronous leg 56. As shown in FIG. 18, replication between R11 at site C and R21 at site A is resumed over asynchronous leg 50. As shown in FIG. 19, replication between R21 at site D and R22 at site B is resumed over synchronous leg 52. A consistency group refresh is performed as indicated in FIG. 20. MSC is reactivated ss shown in FIG. 21, thereby completing the R11-R21 inter-region (site A to site C) swap.

Figure 22:
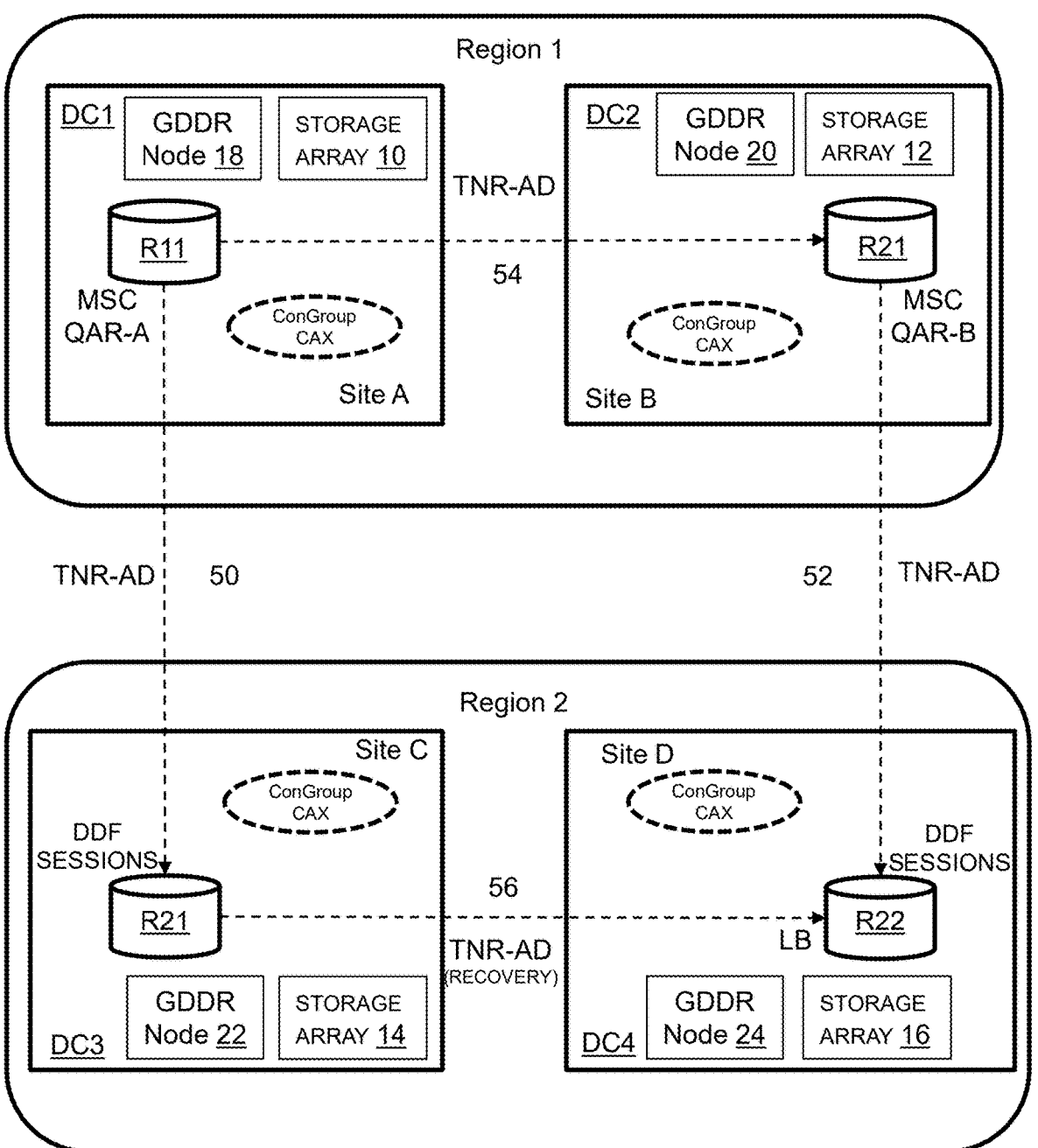
FIGS. 22 through 34 illustrate an R11-R22 inter-region (site A to site D) swap sequence that avoids creation of a cascaded R21.
Figure 23:
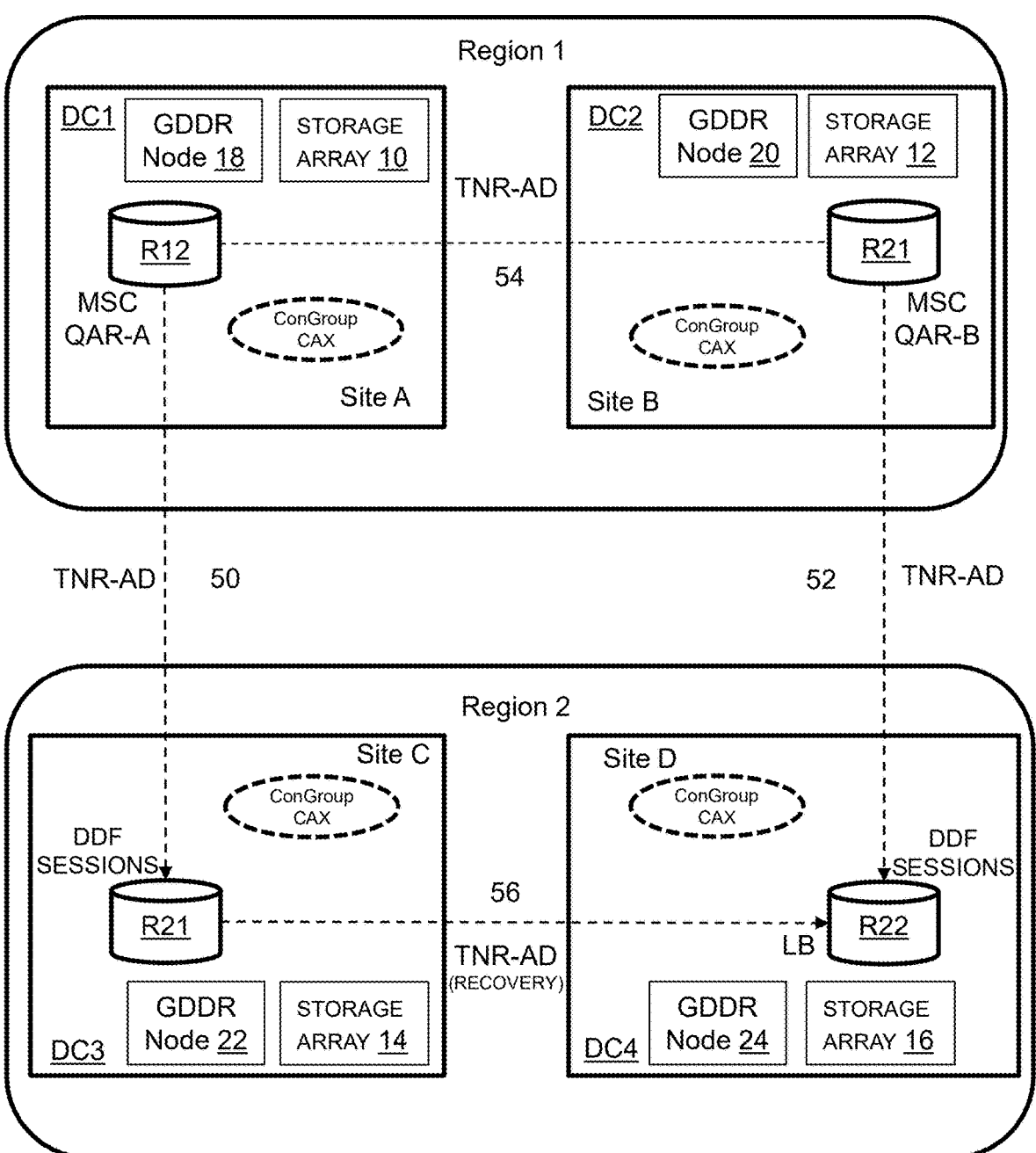
Figure 24:
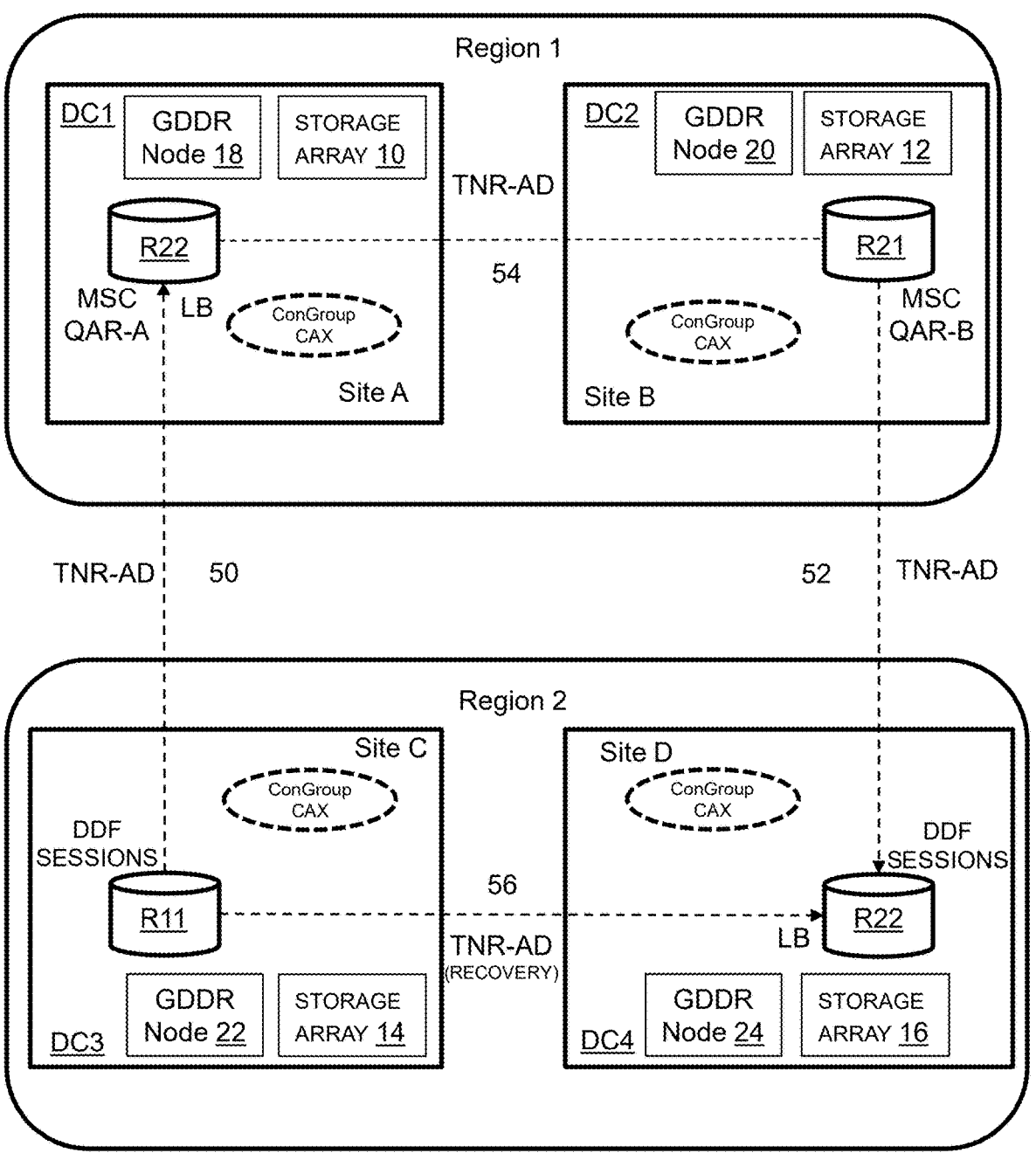
Figure 25:
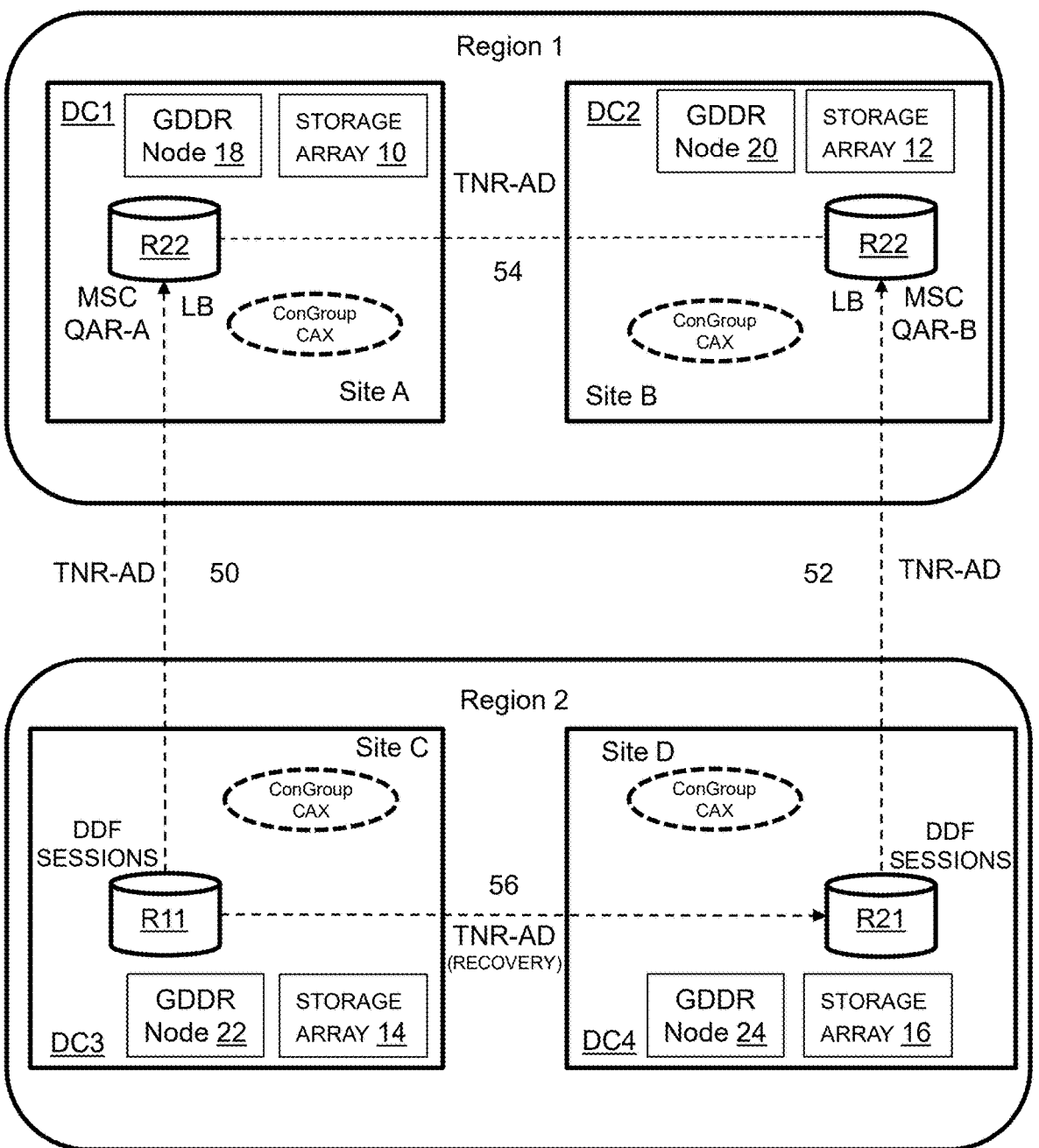
Figure 26:
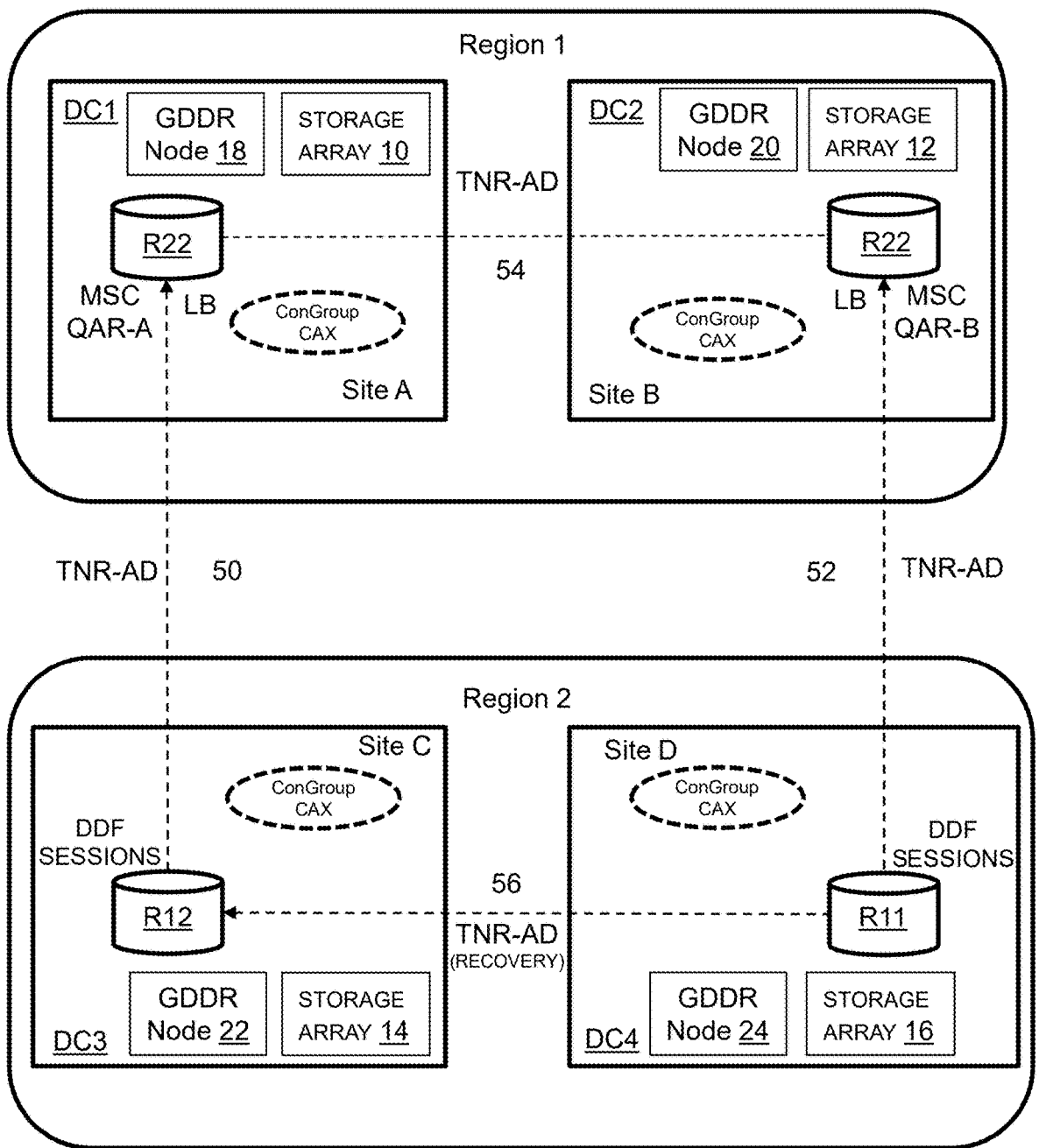
Figure 27:
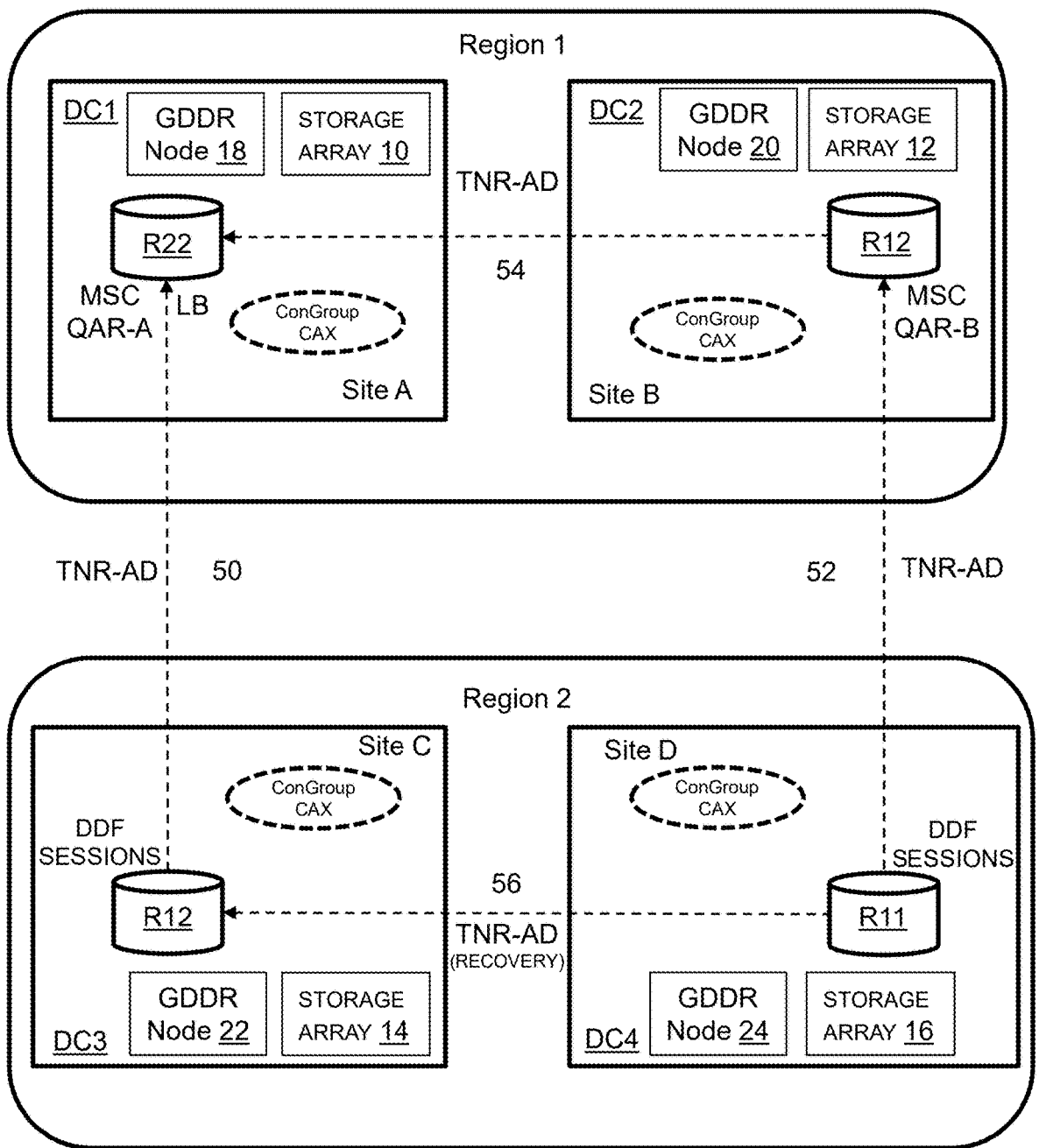
Figure 28:
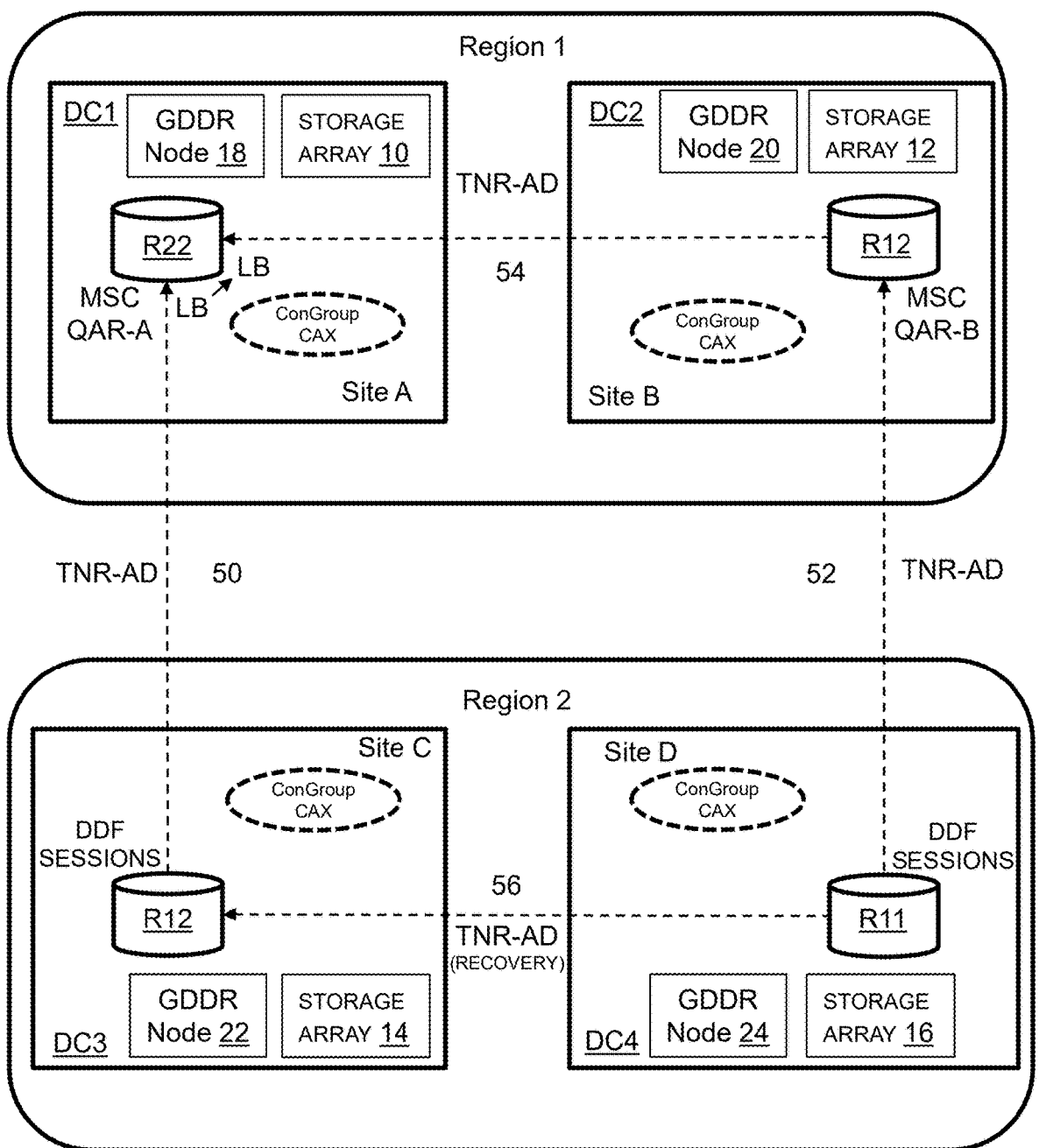
Figure 29:
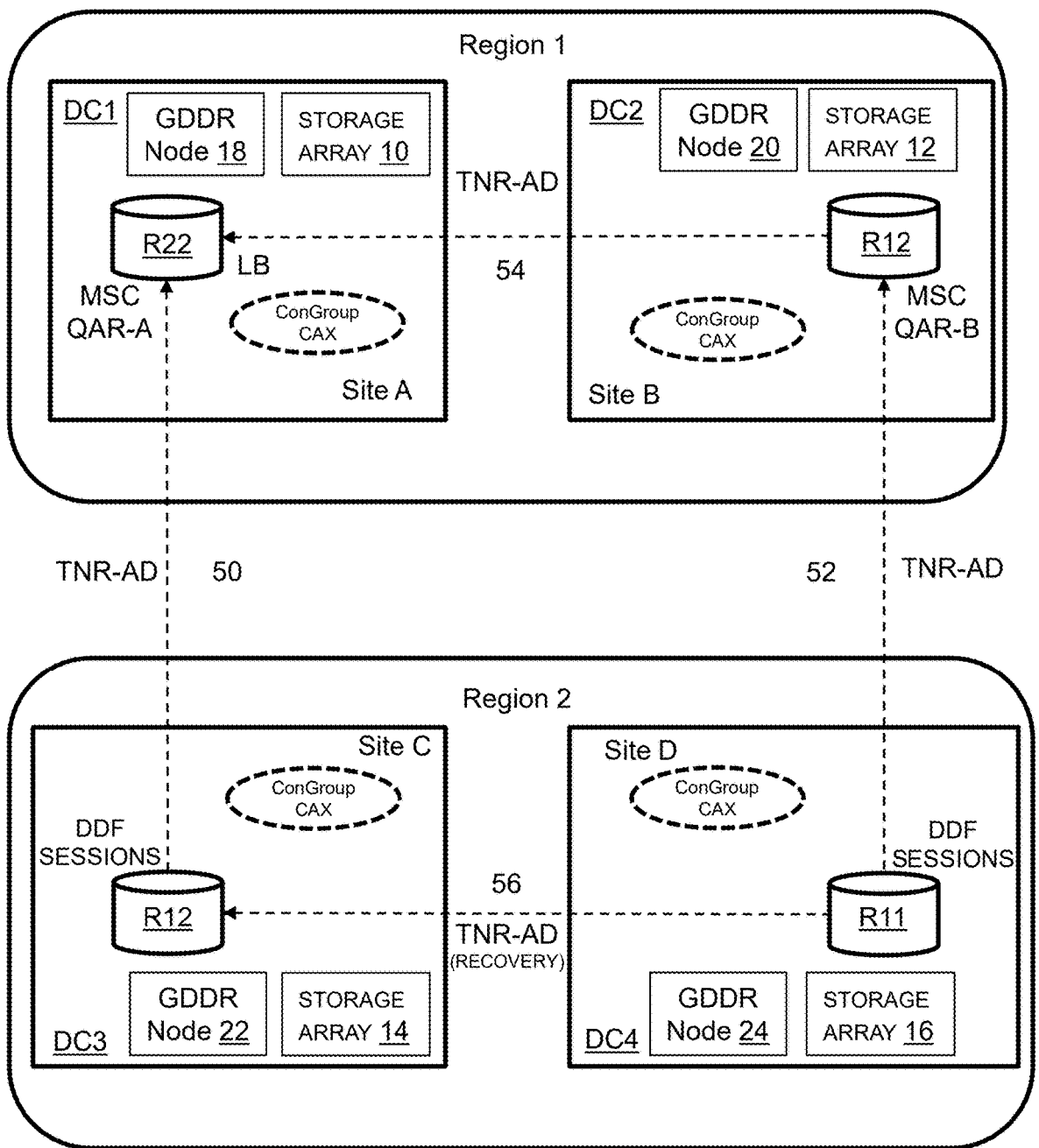
Figure 30:
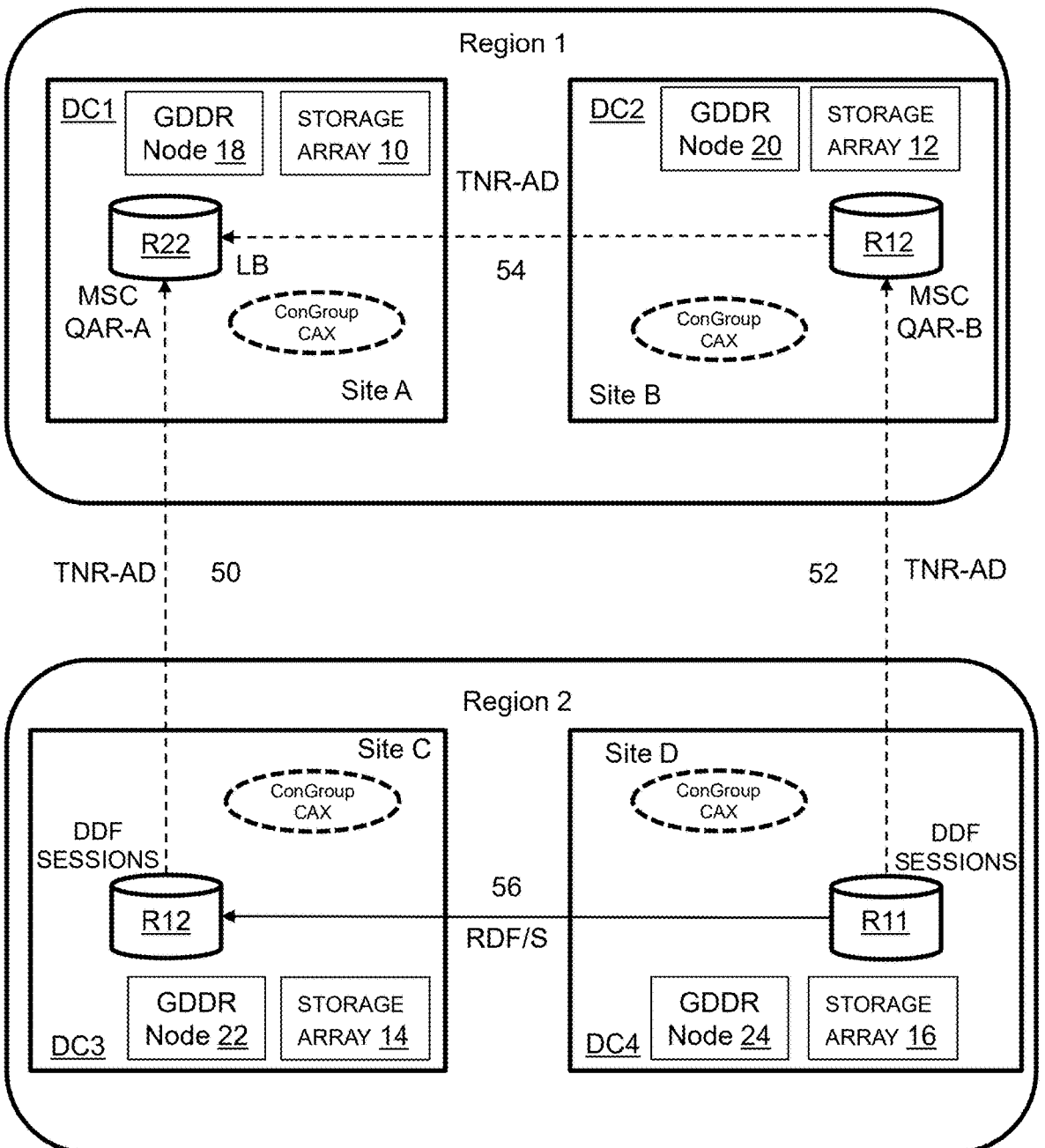
Figure 31:
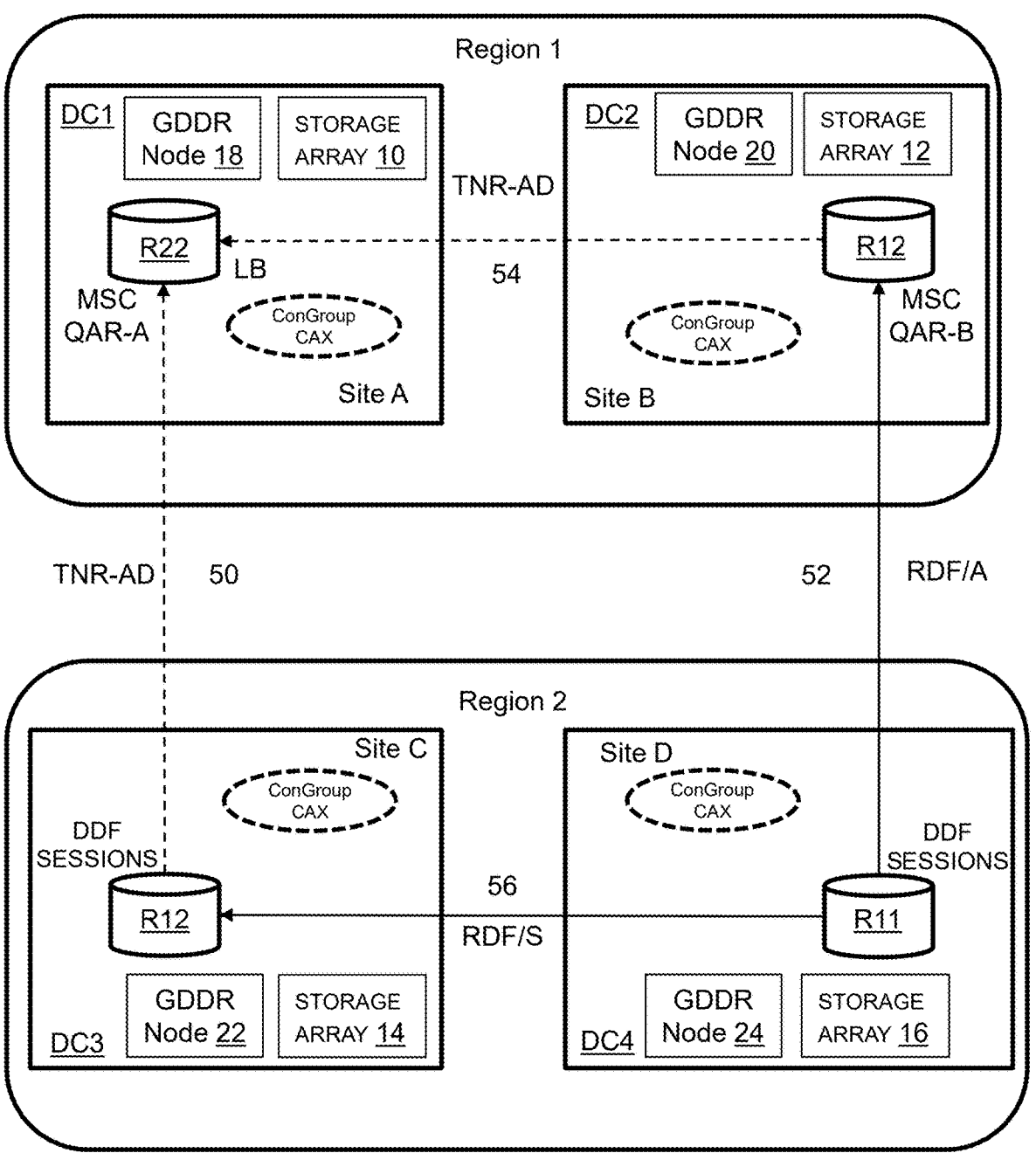
Figure 32:
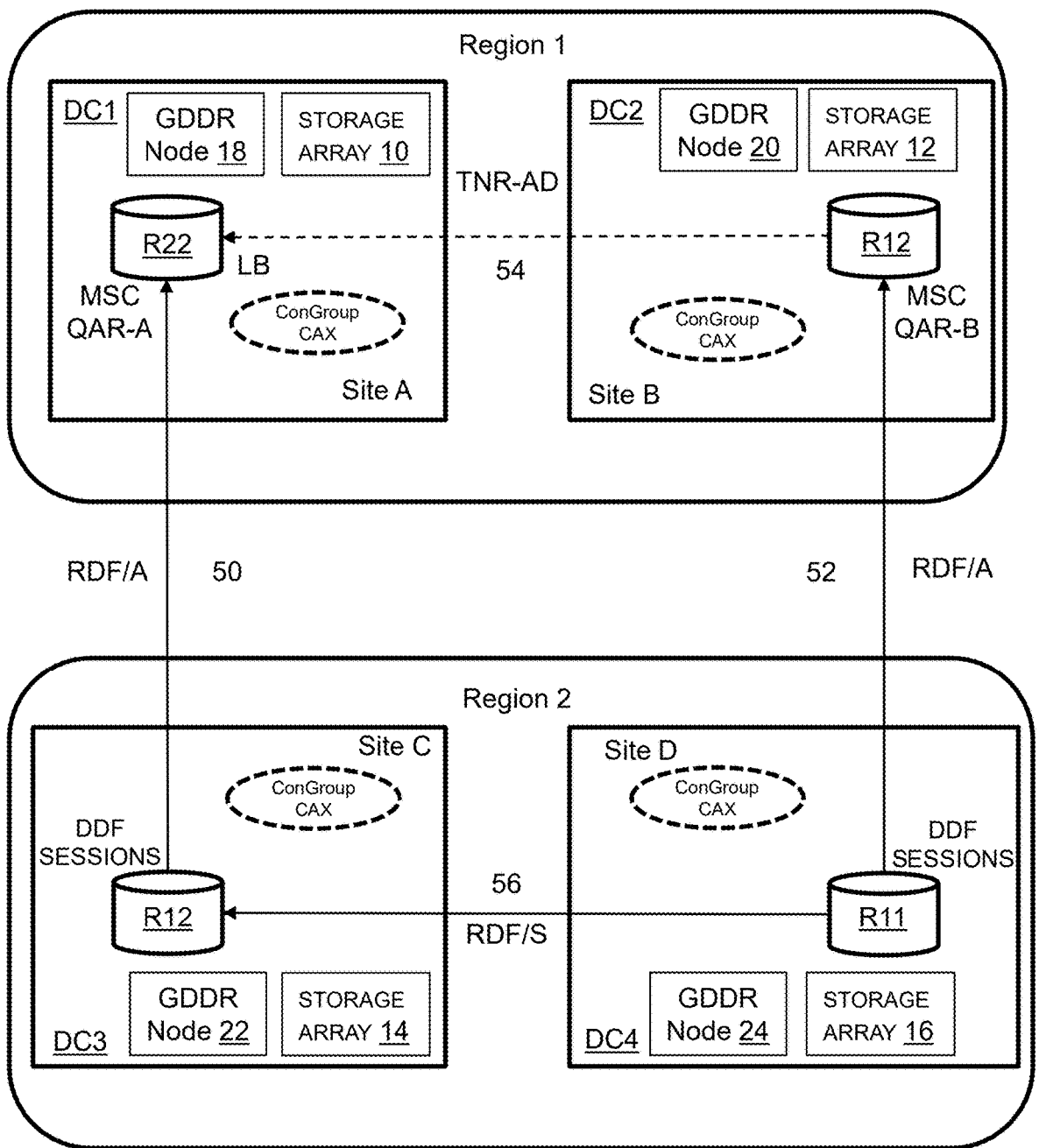
Figure 33:
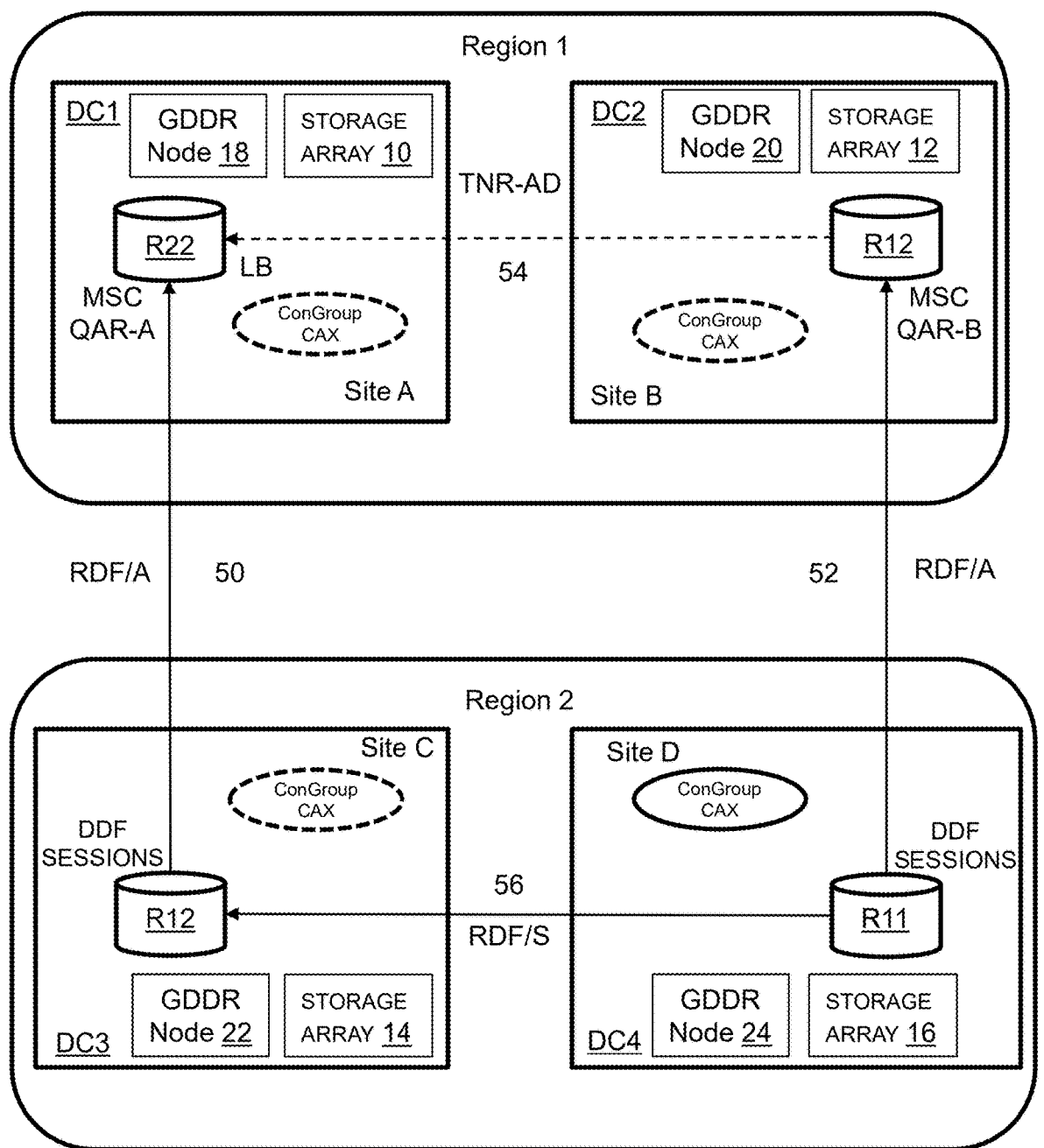
Figure 34:
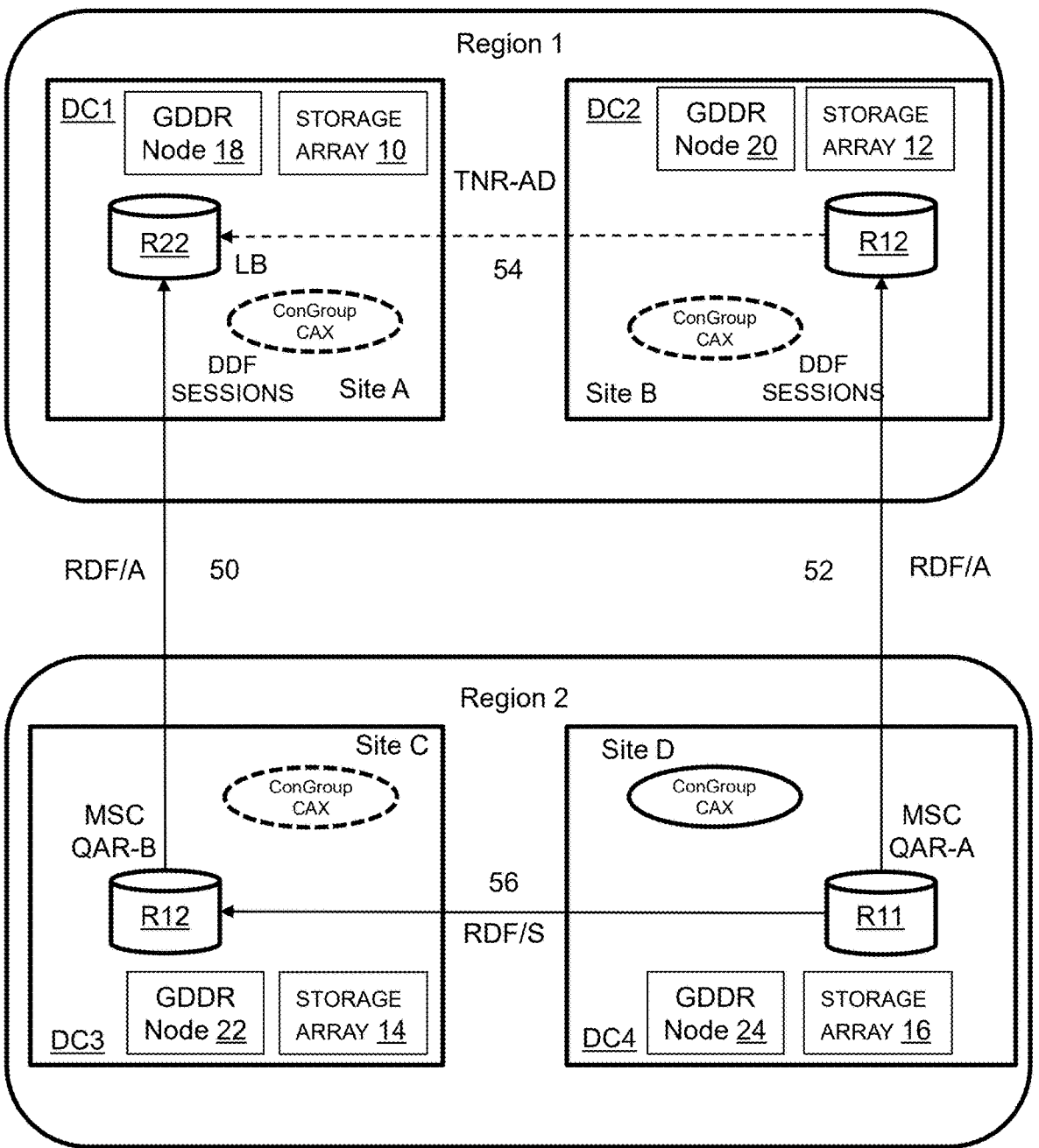

FIGS. 22 through 34 illustrate an R11-R22 inter-region (site A to site D) swap sequence that avoids creation of a cascaded R21. As shown in FIG. 22, suspension of replication causes the consistency group at site A to become inaccessible to the hosts, RDF/S replication over leg 54 is inactivated (set to TNR-AD), and RDF/A replication over leg 50 and leg 52 is inactivated (set to TNR-AD). As shown in FIG. 23, a half swap changes the personality of the replica at site A to R12. As shown in FIG. 24, a full swap between DC1 and DC3 results in an R22 replica at site A and an R11 replica at site C. As shown in FIG. 25, a full swap between DC2 and DC4 results in an R22 replica at site B and an R21 replica at site D. As shown in FIG. 26, a full swap between DC3 and DC4 results in an R12 replica at site C and an R22 replica at site D. As shown in FIG. 27, a half swap changes the personality of the replica at site B to R12. As shown in FIG. 28, the pairing relationship of the R22 replica at site A is switched from the R12 at site C to the R12 at site B. As shown in FIG. 29, differential tracking is resumed at DC4. As shown in FIG. 30, replication between DC4 and DC3 is resumed over synchronous leg 56 (from site D to site C). As shown in FIG. 31, replication between DC4 and DC2 is resumed over asynchronous leg 52 (from site D to site B). As shown in FIG. 32, replication between DC3 and DC1 is resumed over asynchronous leg 50 (from site C to site A). A consistency group refresh is performed as shown in FIG. 33. MSC is reactivated ss shown in FIG. 34, thereby completing the R11-R22 inter-region (site A to site D) swap.

Figure 35:
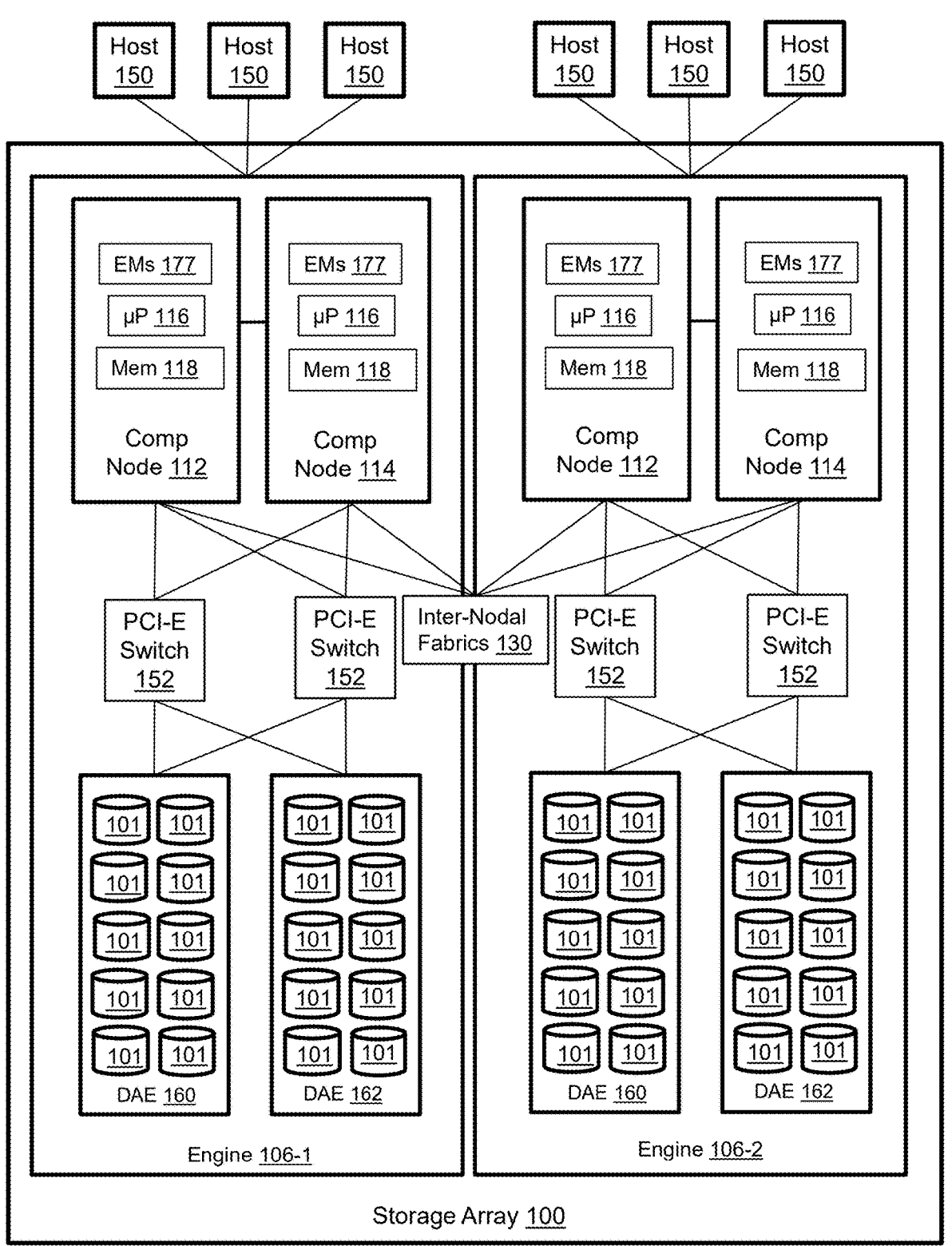
FIG. 35 illustrates an example of a storage array.

FIG. 35 illustrates an example of a storage array 100 in greater detail. The illustrated storage array 100 is shown with two engines 106-1, 106-2, but might include any number of engines. Each engine includes disk array enclo-sures (DAEs) 160, 162 and a pair of peripheral component interconnect express (PCI-e) interconnected compute nodes 112, 114 (aka storage directors) in a failover relationship. Within each engine, the compute nodes and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board and includes resources such as at least one multi-core processor 116 and local memory 118. Pro-cessor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array. Each compute node includes one or more adapters and ports for communicating with host serv-ers 150 for servicing IOs from the host servers. Each compute node also includes one or more adapters for com-municating with other compute nodes via redundant inter-nodal channel-based InfiniBand fabrics 130. Each compute node 112, 114 runs emulations (EMs 177) for completing different storage-related tasks and functions. Front-end emu-lations handle communications with the host servers 150. For example, front-end emulations receive IO commands from host servers and return data and write acknowledge-ments to the host servers. Back-end emulations handle communications with managed drives 101 in the DAEs 160, 162. Data services emulations process IOs. Remote data services emulations handle communications with other storage systems, e.g., other storage arrays for remote replication and remote snapshot creation.

Figure 36:
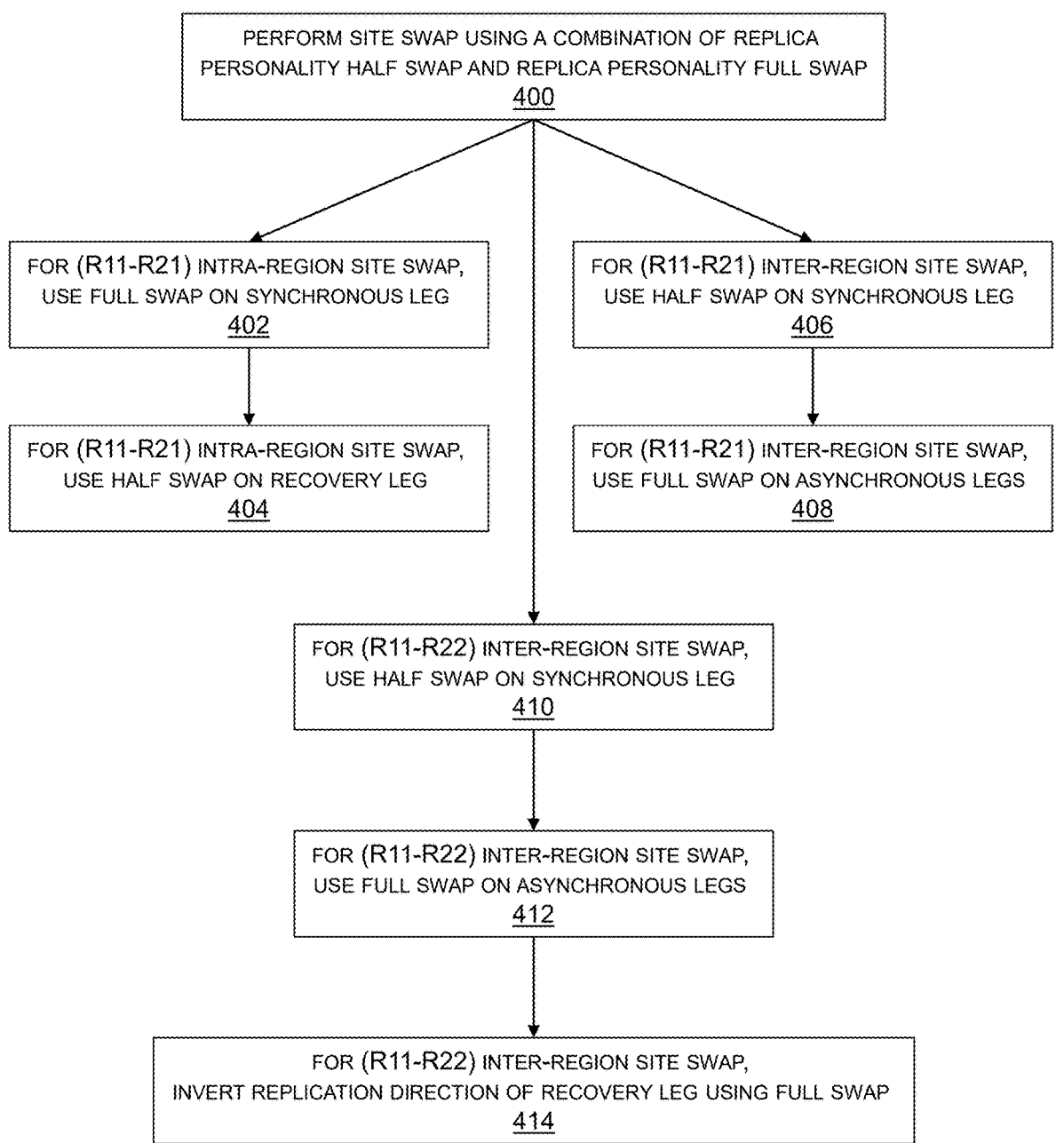
FIG. 36 illustrates a method for performing personality swaps in a GDDR RDF/QAR while avoiding creation of a cascaded R21.

FIG. 36 illustrates a method for performing personality swaps in a GDDR RDF/QAR while avoiding creation of a cascaded R21. The method may be implemented with software running on the previously described electronic hardware. As indicated in step 400, site swaps are performed using a combination of half swap operations and full swap operations. Half swaps are limited to mirror pairings that do not require an RDF resume command in the affected swap sequence and require half swap to avoid the cascaded R21 problem. Changing the replication direction for the other mirror pairings, if necessary in the context of a site or region swap sequence, is done using full swap commands, thus enabling fast RDF resume processing on those legs. For an R11-R21 intra-region site swap, full swap is used on the synchronous leg as indicated in step 402 and half swap is used on the recovery leg as indicated in step 404. For an R11-R21 inter-region site swap, half swap is used on the synchronous leg as indicated in step 406 and full swap is used on the asynchronous legs as indicated in step 408. For an R11-R22 inter-region site swap, half swap is used on the synchronous leg as indicated in step 410, full swap is used on the asynchronous legs as indicated in step 412, and the replication direction of the recovery leg is inverted using full swap as indicated in step 414.

Specific examples have been presented to provide context and convey inventive concepts. The specific examples are not limiting. A wide variety of modifications may be made without departing from the scope of the inventive concepts described herein. Moreover, the features, aspects, implementations, and embodiments described herein may be combined in any technically possible way. Accordingly, modifications and combinations are within the scope of the following claims.

What is claimed is:

1. An apparatus comprising:
   a geographically dispersed disaster restart data facility with quadrilateral replication comprising a first storage array in a first datacenter in a first region, a second storage array in a second datacenter in the first region, a third storage array in third datacenter in a second region, and a fourth storage array in fourth datacenter in the second region;
   the first storage array configured to maintain a R11 storage object that is synchronously replicated to a first R21 storage object maintained by the second storage array via a synchronous leg;
   the first storage array further configured to asynchronously replicate the first R11 storage object to a second R21 storage object maintained by the third storage array via a first asynchronous leg;
   the second storage array configured to asynchronously replicate the first R21 storage object to a R22 storage object maintained by the fourth storage array via a second asynchronous leg;
   the second R21 storage object maintained by the third storage array being paired with the R22 storage object maintained by the fourth storage array via a recovery leg;
   the geographically dispersed disaster restart data facility with quadrilateral replication configured to perform site swaps using a combination of replica personality half swaps and replica personality full swaps.

2. The apparatus of claim 1 further comprising the geographically dispersed disaster restart data facility with quadrilateral replication configured to perform the half swaps only with replica mirror pairings that require a half swap to avoid creation of a cascaded R21.

3. The apparatus of claim 1 further comprising the geographically dispersed disaster restart data facility with quadrilateral replication configured to perform an intra-region site swap between the R11 storage object and the first R21 storage object using a full swap on the synchronous leg and a half swap on the recovery leg.

4. The apparatus of claim 3 further comprising the geographically dispersed disaster restart data facility with quadrilateral replication configured to perform the intra-region site swap between the R11 storage object and the first R21 storage object using, in order, a half swap at the third data center, a full swap on the synchronous leg, and a half swap at the fourth data center.

5. The apparatus of claim 1 further comprising the geographically dispersed disaster restart data facility with quadrilateral replication configured to perform an inter-region site swap between the R11 storage object and the second R21 storage object using a half swap on the synchronous leg and full swaps on the first and second asynchronous legs.

6. The apparatus of claim 5 further comprising the geographically dispersed disaster restart data facility with quadrilateral replication configured to perform an inter-region site swap between the R11 storage object and the second R21 storage object using, in order, a half swap at the first data center, a full swap on the first asynchronous leg, a full swap on the second asynchronous leg, and a half swap at the first data center.

7. The apparatus of claim 1 further comprising the geographically dispersed disaster restart data facility with quadrilateral replication configured to perform an inter-region site swap between the R11 storage object and the R22 storage object using a half swap on the synchronous leg, a full swap on the first and second asynchronous legs, and inverting replication direction of the recovery leg using a full swap.

8. A method comprising:
   in a storage system comprising a geographically dispersed disaster restart data facility with quadrilateral replication comprising a first storage array in a first datacenter in a first region, a second storage array in a second datacenter in the first region, a third storage array in third datacenter in a second region, and a fourth storage array in fourth datacenter in the second region;
   configuring the first storage array to maintain a R11 storage object that is synchronously replicated to a first R21 storage object maintained by the second storage array via a synchronous leg;
   configuring the first storage array to asynchronously replicate the first R11 storage object to a second R21 storage object maintained by the third storage array via a first asynchronous leg;
   configuring the second storage array to asynchronously replicate the first R21 storage object to a R22 storage object maintained by the fourth storage array via a second asynchronous leg;
   pairing the second R21 storage object maintained by the third storage array with the R22 storage object maintained by the fourth storage array via a recovery leg; and
   performing site swaps using a combination of replica personality half swaps and replica personality full swaps.

9. The method of claim 8 further comprising performing the half swaps only with replica mirror pairings that require a half swap to avoid creation of a cascaded R21.

10. The method of claim 8 further comprising performing an intra-region site swap between the R11 storage object and the first R21 storage object using a full swap on the synchronous leg and a half swap on the recovery leg.

11. The method of claim 10 further comprising using, in order, a half swap at the third data center, a full swap on the synchronous leg, and a half swap at the fourth data center.

12. The method of claim 8 further comprising performing an inter-region site swap between the R11 storage object and the second R21 storage object using a half swap on the synchronous leg and full swaps on the first and second asynchronous legs.

13. The method of claim 12 further comprising using, in order, a half swap at the first data center, a full swap on the first asynchronous leg, a full swap on the second asynchronous leg, and a half swap at the first data center.

14. The method of claim 8 further comprising performing an inter-region site swap between the R11 storage object and the R22 storage object using a half swap on the synchronous leg, a full swap on the first and second asynchronous legs, and inverting replication direction of the recovery leg using a full swap.

15. A non-transitory computer-readable storage medium that stores instructions that when executed by at least one computer in a storage system including a first storage array in a first datacenter in a first region, a second storage array in a second datacenter in the first region, a third storage array in third datacenter in a second region, and a fourth storage array in fourth datacenter in the second region, perform a method comprising:

configuring the first storage array to maintain a R11 storage object that is synchronously replicated to a first R21 storage object maintained by the second storage array via a synchronous leg;

configuring the first storage array to asynchronously replicate the first R11 storage object to a second R21 storage object maintained by the third storage array via a first asynchronous leg;

configuring the second storage array to asynchronously replicate the first R21 storage object to a R22 storage object maintained by the fourth storage array via a second asynchronous leg;

pairing the second R21 storage object maintained by the third storage array with the R22 storage object maintained by the fourth storage array via a recovery leg; and performing site swaps using a combination of replica personality half swaps and replica personality full swaps.

16. The non-transitory computer-readable storage medium of claim 15 in which the method further comprises performing the half swaps only with replica mirror pairings that require a half swap to avoid creation of a cascaded R21.

17. The non-transitory computer-readable storage medium of claim 15 in which the method further comprises performing an intra-region site swap between the R11 storage object and the first R21 storage object using a full swap on the synchronous leg and a half swap on the recovery leg.

18. The non-transitory computer-readable storage medium of claim 17 in which the method further comprises using, in order, a half swap at the third data center, a full swap on the synchronous leg, and a half swap at the fourth data center.

19. The non-transitory computer-readable storage medium of claim 15 in which the method further comprises performing an inter-region site swap between the R11 storage object and the second R21 storage object using a half swap on the synchronous leg and full swaps on the first and second asynchronous legs.

20. The non-transitory computer-readable storage medium of claim 15 in which the method further comprises performing an inter-region site swap between the R11 storage object and the R22 storage object using a half swap on the synchronous leg, a full swap on the first and second asynchronous legs, and inverting replication direction of the recovery leg using a full swap.

* * * * *